(12) United States Patent
Amitai et al.

(10) Patent No.: US 9,740,013 B2
(45) Date of Patent: Aug. 22, 2017

(54) COLLIMATING OPTICAL DEVICE AND SYSTEM

(71) Applicant: LUMUS LTD., Rehovot (IL)

(72) Inventors: Yaakov Amitai, Rehovot (IL); Naamah Levin, Rehovot (IL); Mali Mansharof, Rehovot (IL)

(73) Assignee: LUMUS LTD., Rehovot (IL)

( * ) Notice: Subject to any disclaimer, the term of this patent is extended or adjusted under 35 U.S.C. 154(b) by 20 days.

(21) Appl. No.: 15/234,700

(22) Filed: Aug. 11, 2016

(65) Prior Publication Data

US 2016/0349518 A1 Dec. 1, 2016

Related U.S. Application Data

(62) Division of application No. 14/149,036, filed on Jan. 7, 2014, now Pat. No. 9,448,408, which is a division
(Continued)

(30) Foreign Application Priority Data

Apr. 22, 2007 (IL) .......................................... 182705
Apr. 15, 2008 (IL) .......................................... 190881

(51) Int. Cl.
*G02B 27/30* (2006.01)
*G02B 27/01* (2006.01)
(Continued)

(52) U.S. Cl.
CPC .......... *G02B 27/0172* (2013.01); *G02B 5/04* (2013.01); *G02B 5/045* (2013.01); *G02B 5/30* (2013.01); *G02B 5/3066* (2013.01); *G02B 5/3083* (2013.01); *G02B 5/32* (2013.01); *G02B 6/003* (2013.01); *G02B 6/0035* (2013.01); *G02B 6/272* (2013.01); *G02B 6/2706* (2013.01);
(Continued)

(58) Field of Classification Search
CPC ............ G02B 27/0101; G02B 27/0172; G02B 27/1006; G02B 27/28; G02B 27/30; G02B 5/04; G02B 5/30; G02B 6/0035; G02B 6/34; G02B 27/145; G02B 27/283
USPC ....................... 359/629, 631, 641; 385/31, 37
See application file for complete search history.

(56) References Cited

U.S. PATENT DOCUMENTS 3,658,405 A  4/1972 Pluta
3,677,621 A  7/1972 Smith
(Continued)

FOREIGN PATENT DOCUMENTS

EP  1 385 023  1/2004
EP  1 562 066  10/2005
(Continued)

*Primary Examiner* — Ricky D Shafer

(57) ABSTRACT

There is provided a light-guide, compact collimating optical device, including a light-guide having a light-waves entrance surface, a light-waves exit surface and a plurality of external surfaces, a light-waves reflecting surface carried by the light-guide at one of the external surfaces, two retardation plates carried by light-guides on a portion of the external surfaces, a light-waves polarizing beamsplitter disposed at an angle to one of the light-waves entrance or exit surfaces, and a light-waves collimating component covering a portion of one of the retardation plates. A system including the optical device and a substrate, is also provided.

30 Claims, 29 Drawing Sheets

Related U.S. Application Data of application No. 12/596,823, filed as application No. PCT/IL2008/000523 on Apr. 17, 2008, now Pat. No. 8,643,948.

(51) Int. Cl.

| | | |
|---|---|---|
| *G02B 6/34* | (2006.01) | |
| *G02B 6/27* | (2006.01) | |
| *G02B 5/30* | (2006.01) | |
| *G02B 5/04* | (2006.01) | |
| *G02B 23/02* | (2006.01) | |
| *H04N 13/04* | (2006.01) | |
| *G02B 27/22* | (2006.01) | |
| *G02B 27/14* | (2006.01) | |
| *G02B 27/10* | (2006.01) | |
| *G02B 5/32* | (2006.01) | |
| *F21V 8/00* | (2006.01) | |
| *G02B 27/28* | (2006.01) | |
| *G02B 27/26* | (2006.01) | |
| *G02F 1/01* | (2006.01) | |
| *G02B 27/00* | (2006.01) | |
| *G02B 6/00* | (2006.01) | |

(52) U.S. Cl.
CPC ......... *G02B 6/2766* (2013.01); *G02B 6/2773* (2013.01); *G02B 6/34* (2013.01); *G02B 23/02* (2013.01); *G02B 27/0025* (2013.01); *G02B 27/0101* (2013.01); *G02B 27/0176* (2013.01); *G02B 27/106* (2013.01); *G02B 27/1006* (2013.01); *G02B 27/145* (2013.01); *G02B 27/22* (2013.01); *G02B 27/2235* (2013.01); *G02B 27/26* (2013.01); *G02B 27/28* (2013.01); *G02B 27/283* (2013.01); *G02B 27/286* (2013.01); *G02B 27/30* (2013.01); *G02F 1/0136* (2013.01); *H04N 13/044* (2013.01); *H04N 13/0429* (2013.01); *G02B 6/00* (2013.01); *G02B 6/0056* (2013.01); *G02B 2027/011* (2013.01); *G02B 2027/015* (2013.01); *G02B 2027/0116* (2013.01); *G02B 2027/0123* (2013.01); *G02B 2027/0125* (2013.01); *G02B 2027/0132* (2013.01); *G02B 2027/0134* (2013.01); *G02B 2027/0178* (2013.01)

(56) References Cited

U.S. PATENT DOCUMENTS

| | | | |
|---|---|---|---|
| 5,764,412 | A | 6/1998 | Suzuki et al. |
| 6,204,975 | B1 | 3/2001 | Watters et al. |
| 6,310,713 | B2 | 10/2001 | Doany et al. |
| 6,406,149 | B2 | 6/2002 | Okuyama |
| 6,829,095 | B2 | 12/2004 | Amitai |
| 7,391,573 | B2 | 6/2008 | Amitai |
| 7,418,170 | B2 | 8/2008 | Mukawa et al. |
| 7,457,040 | B2 | 11/2008 | Amitai |
| 7,710,655 | B2 | 5/2010 | Freeman et al. |
| 8,000,020 | B2 | 8/2011 | Amitai |
| 8,643,948 | B2 | 2/2014 | Amitai et al. |
| 8,810,914 | B2 | 8/2014 | Amitai |
| 8,861,081 | B2 * | 10/2014 | Mansharof ......... G02B 27/0101 359/489.07 |
| 8,902,503 | B2 * | 12/2014 | Amitai ............... G02B 27/0101 359/489.07 |
| 9,069,180 | B2 * | 6/2015 | Amitai ............... G02B 27/0101 |
| 9,104,036 | B2 * | 8/2015 | Amitai ............... G02B 27/0101 |
| 9,207,457 | B2 * | 12/2015 | Amitai ............... G02B 27/0101 |
| 9,279,986 | B2 * | 3/2016 | Amitai ............... G02B 27/0101 |
| 9,316,832 | B2 * | 4/2016 | Levin ................. G02B 27/0172 |
| 9,417,453 | B2 * | 8/2016 | Amitai ................. G02B 6/0035 |
| 2005/0083592 | A1 | 4/2005 | Amitai et al. |
| 2005/0180687 | A1 | 8/2005 | Amitai |
| 2007/0070859 | A1 | 3/2007 | Hirayama |
| 2008/0151379 | A1 | 6/2008 | Amitai |
| 2008/0278812 | A1 | 11/2008 | Amitai |
| 2010/0067110 | A1 | 3/2010 | Hadad et al. |

FOREIGN PATENT DOCUMENTS

| | | |
|---|---|---|
| GB | 1321303 | 6/1973 |
| WO | 98/15868 | 4/1998 |
| WO | 02/088825 | 11/2002 |
| WO | 02/097515 | 12/2002 |
| WO | 03/081320 | 10/2003 |
| WO | 2006/085308 | 8/2006 |
| WO | 2007/093983 | 8/2007 |
| WO | 2008/023367 | 2/2008 |

\* cited by examiner

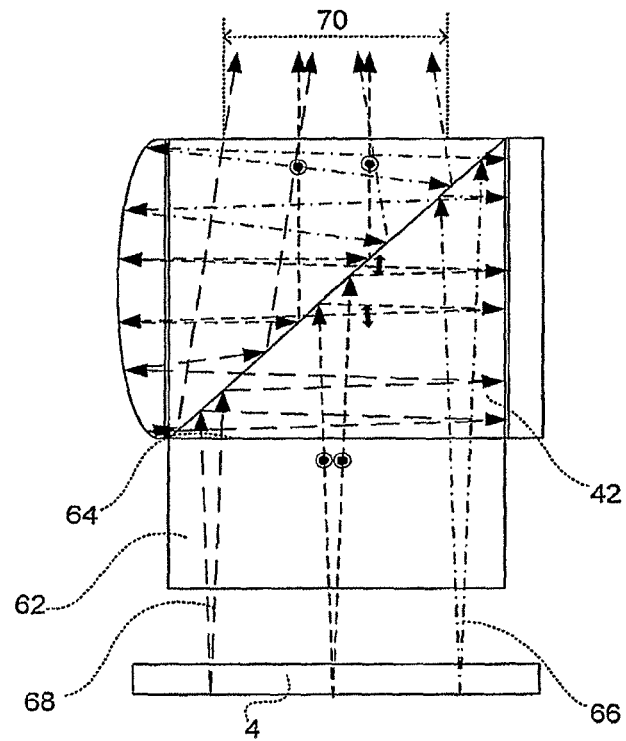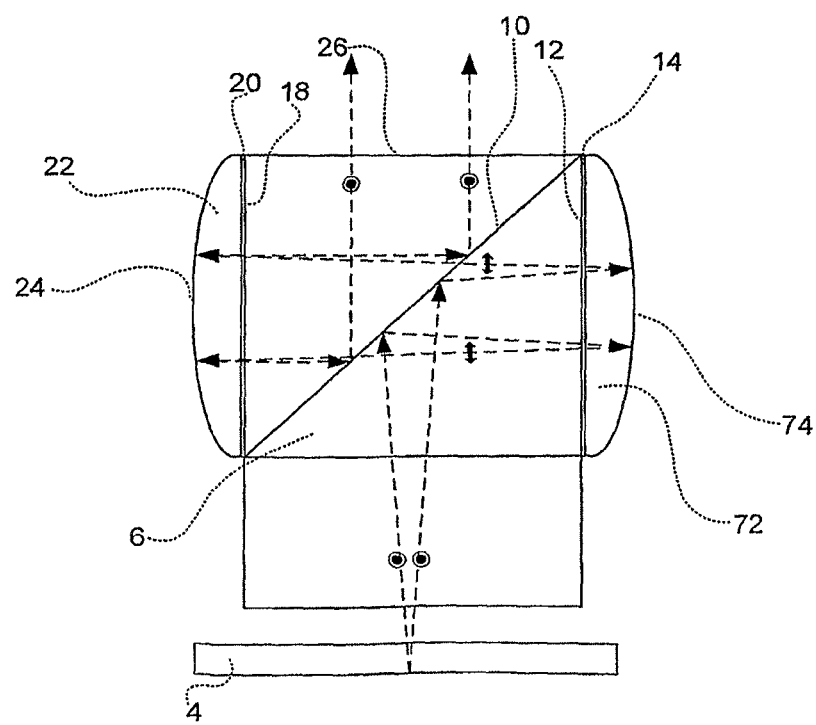

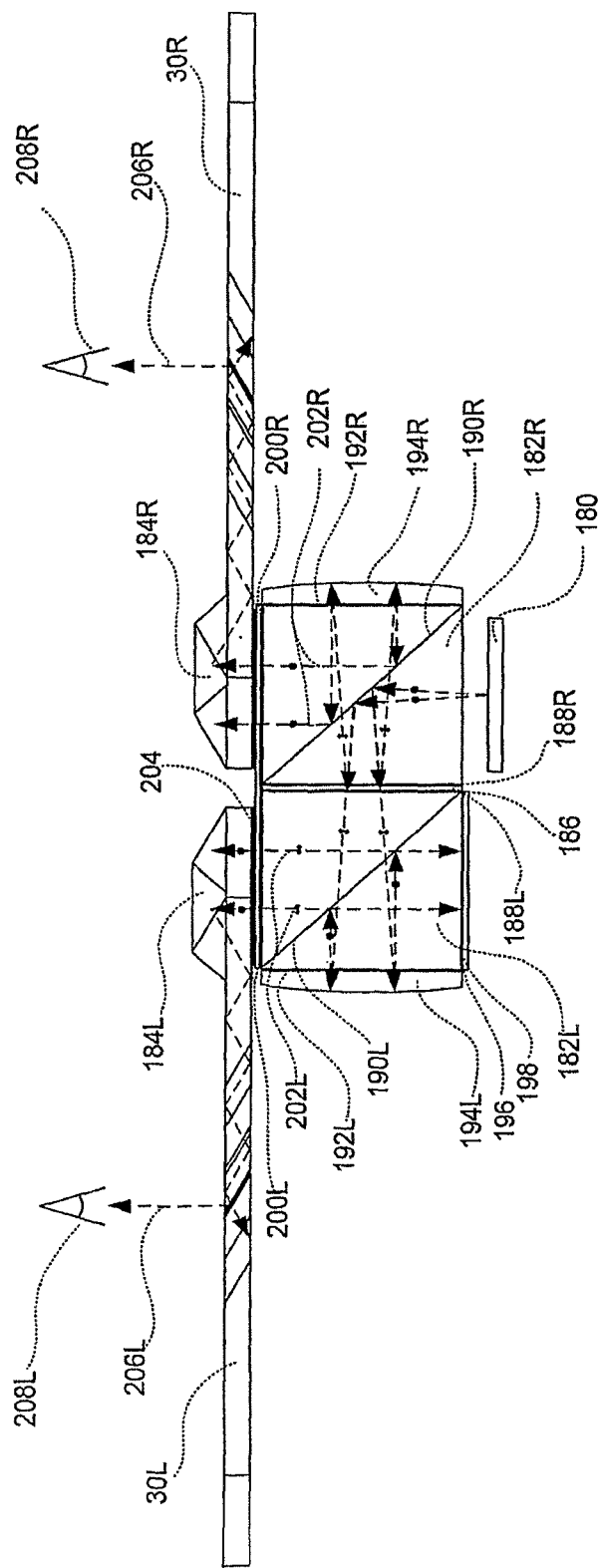

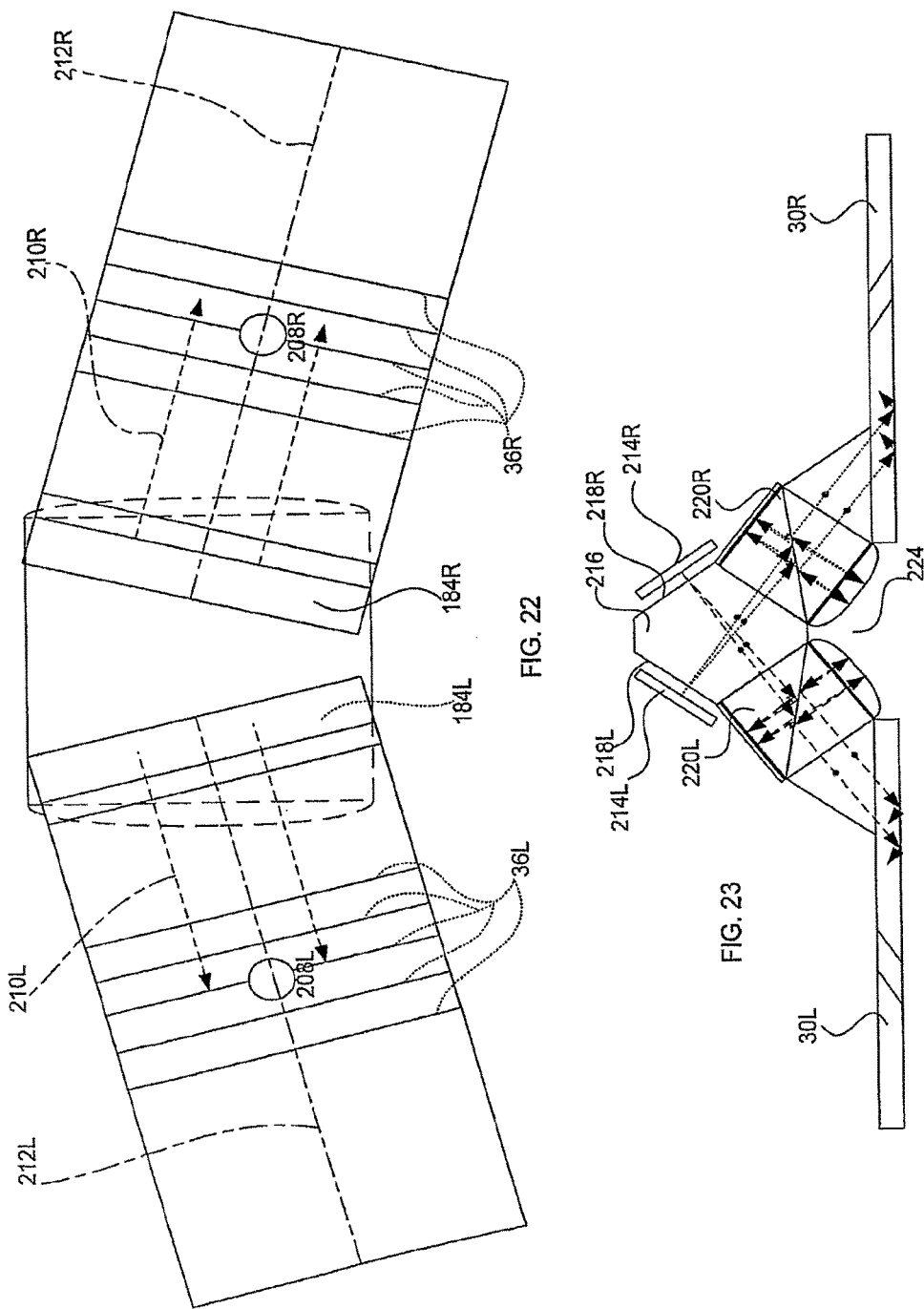

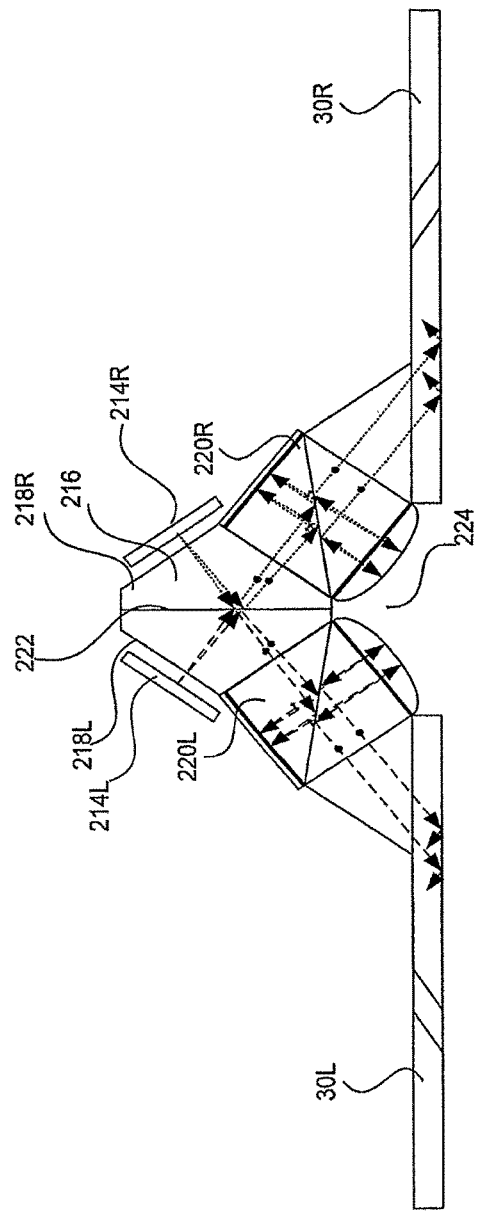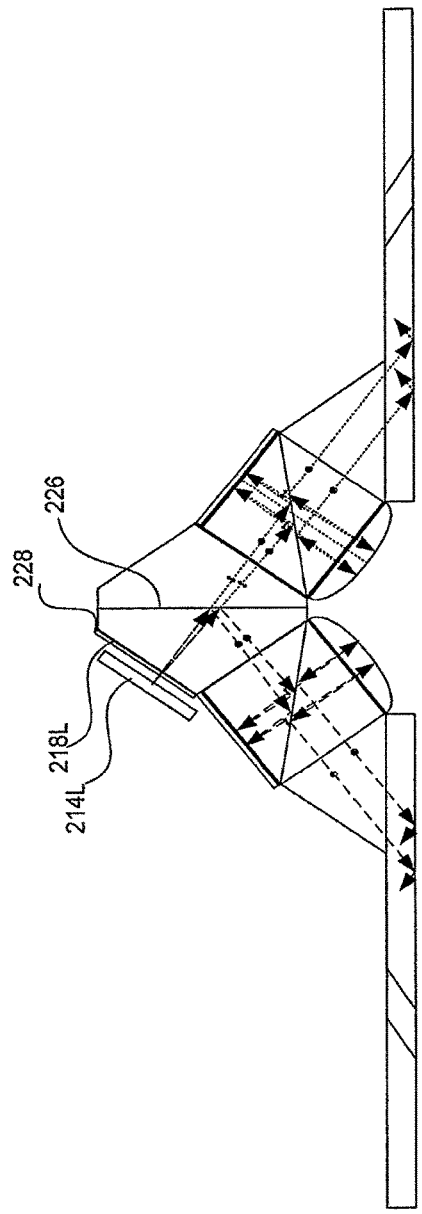
FIG. 24
FIG. 25

COLLIMATING OPTICAL DEVICE AND SYSTEM

CROSS-REFERENCE TO RELATED APPLICATIONS

This application is a divisional application of U.S. Ser. No. 14/149,036, filed Jan. 7, 2014 for a Collimating Optical Device and System, now U.S. Pat. No. 9,448,408, granted Sep. 20, 2016 which is a divisional application of U.S. Ser. No. 12/596,823, filed on Feb. 17, 2010 for a Collimating Optical Device and System, now U.S. Pat. No. 8,643,948, granted Feb. 4, 2014.

FIELD OF THE INVENTION

The present invention relates to light-guide, compact collimating optical devices (LCCDs) and to optical systems which include one or more of these devices. The term "light-guides" refers to any light-transmitting body, preferably light-transmitting, solid bodies, also known as optical substrates.

The invention can be implemented to advantage in a large number of imaging applications, such as head-mounted displays (HMDs) and head-up displays (HUDs), cellular phones, compact displays, 3-D displays, compact beam expanders, as well as non-imaging applications, such as flat-panel indicators, compact illuminators and scanners.

BACKGROUND OF THE INVENTION

One of the important applications for compact optical devices is in the field of HMDs, wherein an optical module serves both as a reflecting optical element and a combiner, in which a two-dimensional display is imaged to infinity and reflected into the eye of an observer. The display can be obtained directly from either a spatial light modulator (SLM), such as a cathode ray tube (CRT), a liquid crystal display (LCD), an organic light emitting diode array (OLED), a scanning source or similar devices, or indirectly, by means of a relay lens or an optical fiber bundle. The display comprises an array of elements (pixels) imaged to infinity by a collimating lens and transmitted into the eye of the viewer by means of a reflecting or partially reflecting surface acting as a combiner for non-see-through and see-through applications, respectively. Typically, a conventional, free-space optical module is used for these purposes. As the desired field-of-view (FOV) of the system increases, such a conventional optical module becomes larger, heavier, bulkier, and therefore, even for a moderate performance device, is impractical. This is a major drawback for all kinds of displays, but especially in head-mounted applications, where the system must necessarily be as light and as compact as possible.

The strive for compactness has led to several different complex optical solutions, all of which, on the one hand, are still not sufficiently compact for most practical applications, and, on the other hand, suffer major drawbacks in terms of manufacturability. Furthermore, the eye-motion-box (EMB) of the optical viewing angles resulting from these designs is usually very small—typically, less than 6 mm. Hence, the performance of the optical system is sensitive, even for small movements of the optical system relative to the eye of the viewer, and does not allow sufficient pupil motion for comfortable reading of text from such displays.

The teachings included in the Publications WO 01/95027, WO 2006/013565, WO 2006/085307, WO 20061/085310, WO 2007/054928, and WO 2008/023367 in the name of Applicant, are herein incorporated by references.

DISCLOSURE OF THE INVENTION

The present invention facilitates the design and fabrication of a compact imaging device for, among other applications, HMDs. The invention allows for relatively wide FOVs together with relatively large EMB values. The resulting optical system offers a large, high-quality image, which also accommodates large movements of the eye. The optical system offered by the present invention is particularly advantageous because it is substantially more compact than state-of-the-art implementations and yet it can be readily incorporated, even into optical systems having specialized configurations.

The invention also enables the construction of improved HUDs. Since the inception of such displays more than three decades ago, there has been significant progress in the field. HUDs have indeed become popular and they now play an important role, not only in most modern combat aircraft, but also in civilian aircraft, in which HUD systems have become a key component for low-visibility landing operation. Furthermore, there have recently been numerous proposals and designs for HUDs in automotive applications, where they can potentially assist the driver in driving and navigation tasks. State-of-the-art HUDs, nevertheless, suffer several significant drawbacks. All HUDs of the current designs require a display light source that must be offset a significant distance from the combiner to ensure that the source illuminates the entire combiner's surface. As a result, the combiner-projector HUD system is necessarily bulky, large and requires considerable installation space, which makes it inconvenient for installation and at times even unsafe to use. The large optical aperture of conventional HUDs also pose a significant challenge for the optical design, either rendering the HUDs with compromising the performance, or leading to high cost wherever high-performance is required. The chromatic dispersion of high-quality holographic HUDs is of particular concern.

A broad object of the present invention is therefore to alleviate the drawbacks of state-of-the-art compact optical display devices and to provide other optical components and systems having improved performance, according to specific requirements.

A further object of the present invention relates to its implementation in a compact HUD, alleviating the aforementioned drawbacks. In the HUD design of the current invention, the combiner is illuminated with a compact display light source that can be attached to the substrate. Hence, the overall system is very compact and can readily be installed in a variety of configurations for a wide range of applications. In addition, the chromatic dispersion of the display is negligible and, as such, can operate with wide spectral sources, including a conventional white-light source. In addition, the present invention expands the image so that the active area of the combiner can be much larger than the area that is actually illuminated by the light source.

A still further object of the present invention is to provide a compact display with a wide FOV for a mobile, hand-held application such as cellular phones and personal display modules. In today's wireless internet-access market; a sufficient bandwidth is available for full video transmission. The limiting factor remains the quality of the display within the device of the end-user. The mobility requirement restricts the physical size of the displays, and the result is a direct-display with poor image viewing quality. The present invention enables a physically very compact display with a very large virtual image. This is a key feature in mobile communications, and especially for mobile internet access, solving one of the main limitations for its practical implementation. Thereby, the present invention enables the viewing of a digital content of a full format internet page within a small, hand-held device, such as a cellular phone.

In accordance with the invention, there is therefore provided, a light-guide, compact collimating optical device, comprising a light-guide having at least one light-waves entrance surface, at least one light-waves exit surface and a plurality of external surfaces, at least one light-waves reflecting surface carried by the light-guide at one of said external surfaces, two or more retardation plates carried by light-guides on at least a portion of said external surfaces, at least one light-waves polarizing beamsplitter disposed at an angle to at least one of said light-waves entrance or exit surfaces, and at least one light-waves collimating component covering at least a portion of at least one of said retardation plates.

The invention further provides an optical system comprising a light-guide, compact collimating optical device, comprising a light-guide having at least one light-waves entrance surface, at least one light-waves exit surface and a plurality of external surfaces, at least one light-waves reflecting surface carried by the light-guide at one of said external surfaces, two or more retardation plates carried by light-guides on at least a portion of said external surfaces, at least one light-waves polarizing beamsplitter disposed at an angle to at least one of said light-waves entrance or exit surfaces, and at least one light-waves collimating component covering at least a portion of at least one of said retardation plates and further comprising a light-waves transmitting substrate having at least two major surfaces.

BRIEF DESCRIPTION OF THE DRAWINGS

The invention is described in connection with certain preferred embodiments, with reference to the following illustrative figures so that it may be more fully understood.

With specific reference to the figures in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention. The description taken with the drawings are to serve as direction to those skilled in the art as to how the several forms of the invention may be embodied in practice.

In the drawings:

FIG. 1 is a schematic diagram illustrating an optical device for collimating input light-waves from a display light source, in accordance with the present invention;

FIG. 2 is a schematic diagram illustrating a system for collimating and coupling-in input light-waves from a display light source into a substrate, in accordance with the present invention;

FIG. 3 is a schematic diagram illustrating another system for collimating and coupling-in input light-waves from a display light source into a substrate, wherein the collimating module is cemented to the substrate, in accordance with the present invention;

FIGS. 4 and 5 are graphs illustrating reflectance curves as a function of incident angles, for an exemplary angular sensitive coating for s- and p-polarized light-waves, respectively;

FIG. 6 is a schematic diagram illustrating yet another embodiment for collimating and coupling-in input light-waves from a display light source into a substrate utilizing a half-wavelength retardation plate, in accordance with the present invention;

FIG. 7 is a schematic diagram illustrating still a further embodiment for collimating and coupling-in input light-waves from a display light source into a substrate utilizing angular sensitive coating, in accordance with the present invention;

FIG. 8 is a schematic diagram illustrating an optical device for collimating input light-waves from a display light source utilizing a blank plate, in accordance with the present invention;

FIG. 9 is a schematic diagram illustrating a device for collimating input light-waves from a display light source by utilizing two lenses and blank plate, in accordance with the present invention;

FIG. 10 is a schematic diagram illustrating a device for collimating input light-waves from a display light source by utilizing two lenses, in accordance with the present invention;

FIG. 11 is a schematic diagram illustrating a device for collimating input light-waves from liquid crystals on silicon (LCOS) light source, in accordance with the present invention;

FIG. 12 is a schematic diagram illustrating another device for collimating input light-waves from an LCOS light source, in accordance with the present invention;

Figure 13:
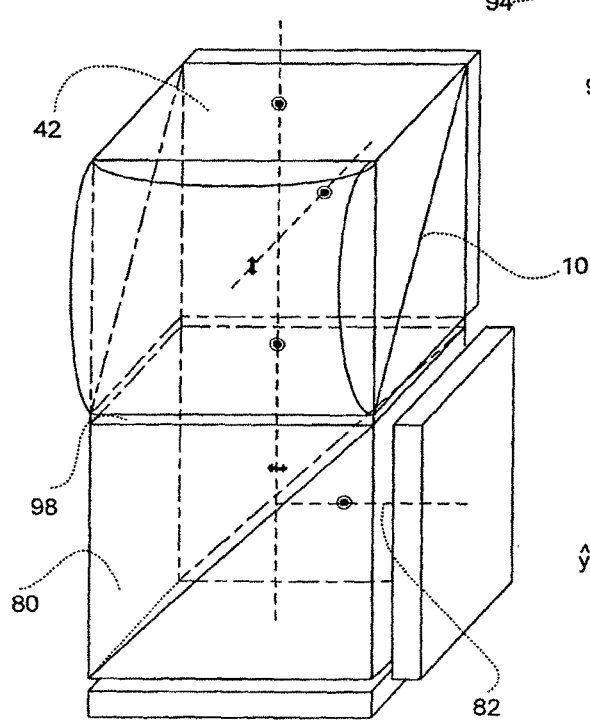
Figure 14:
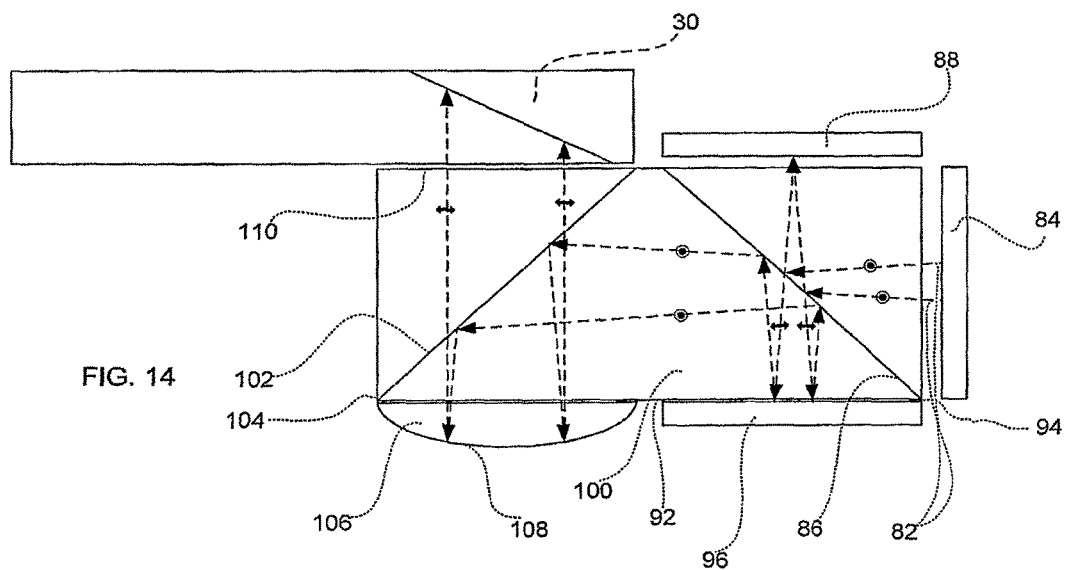
Figure 15:
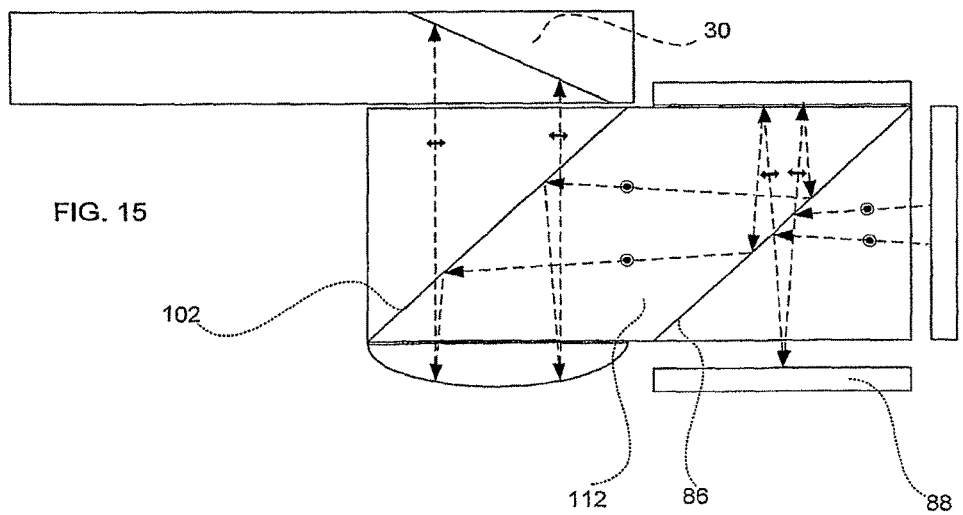
Figure 16:
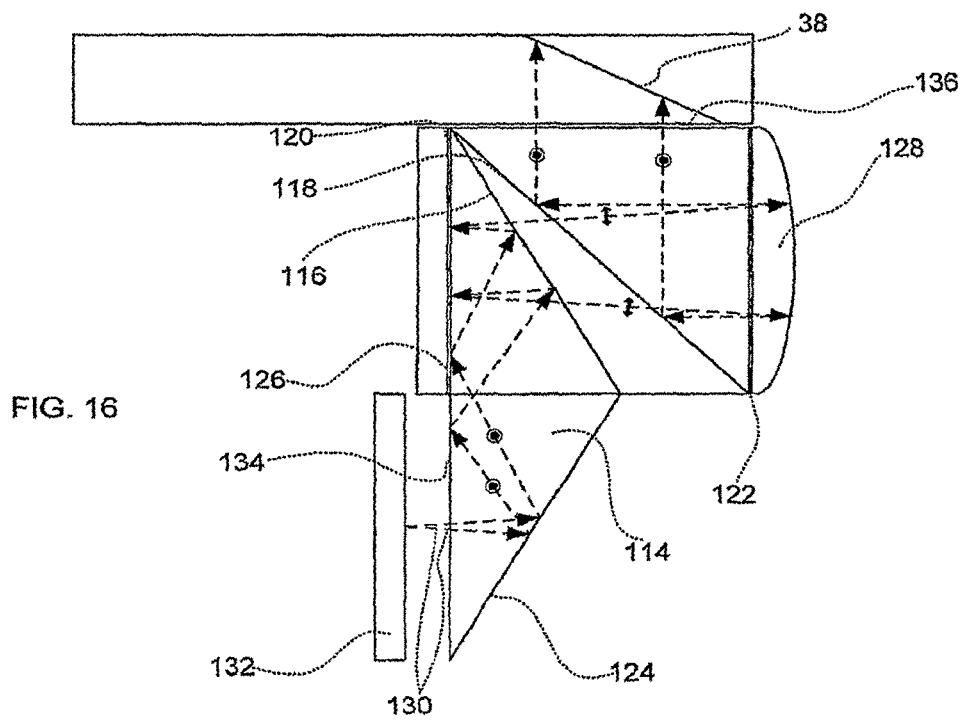
Figure 17:
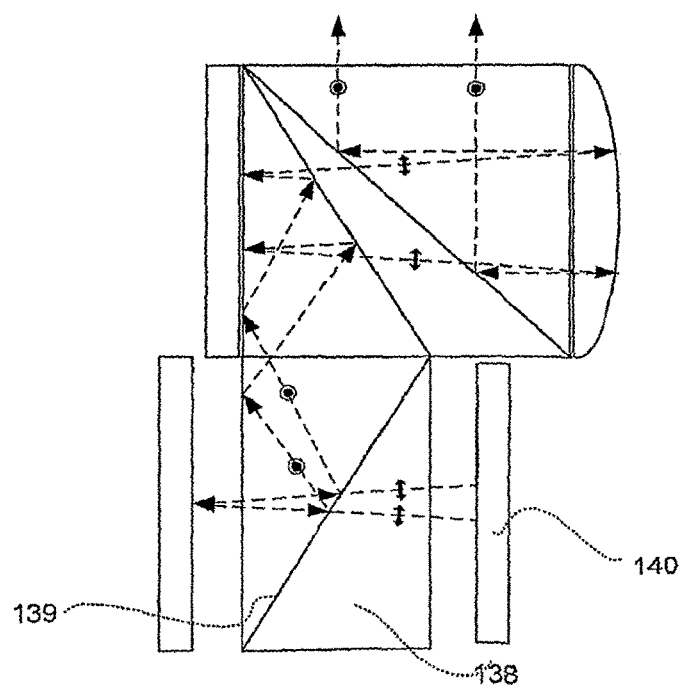
Figure 18:
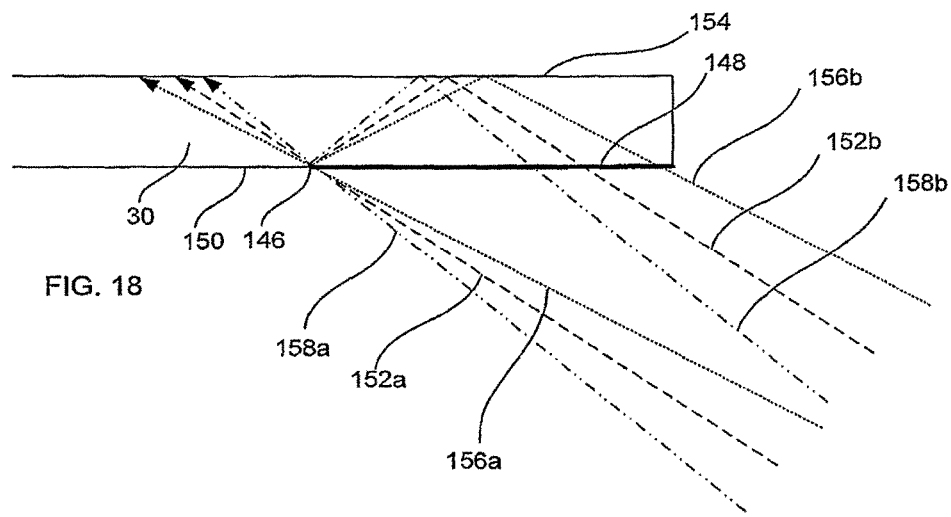
Figure 19:
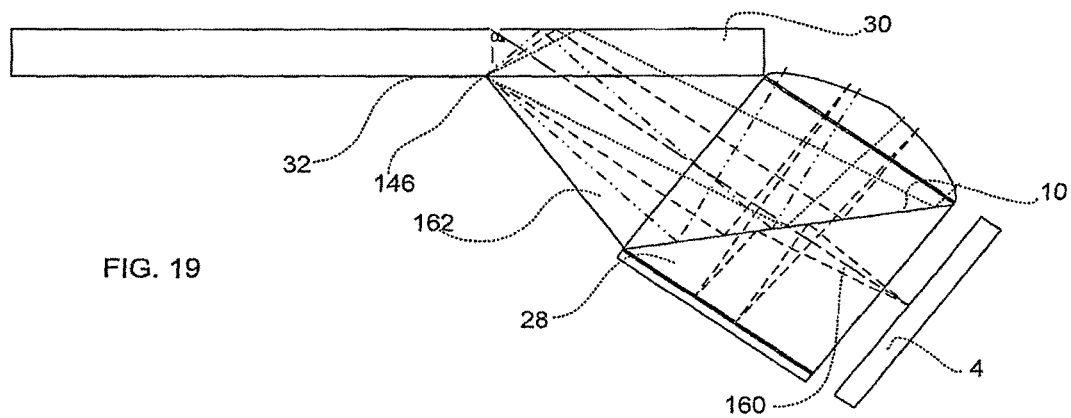
Figure 20:
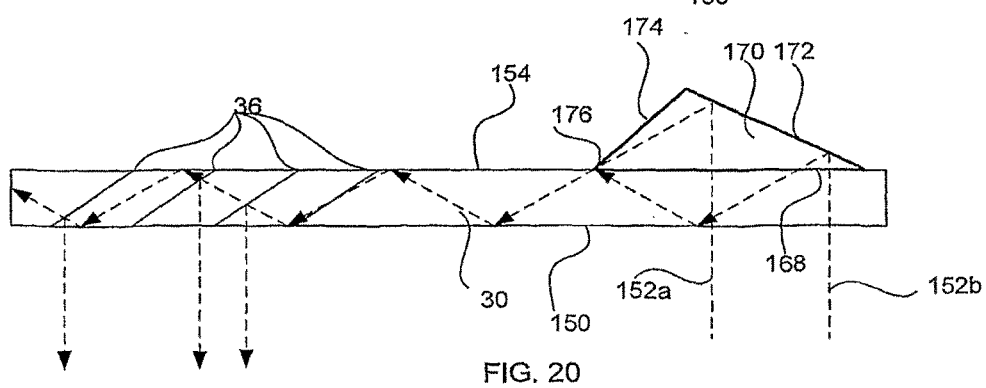
Figure 26:
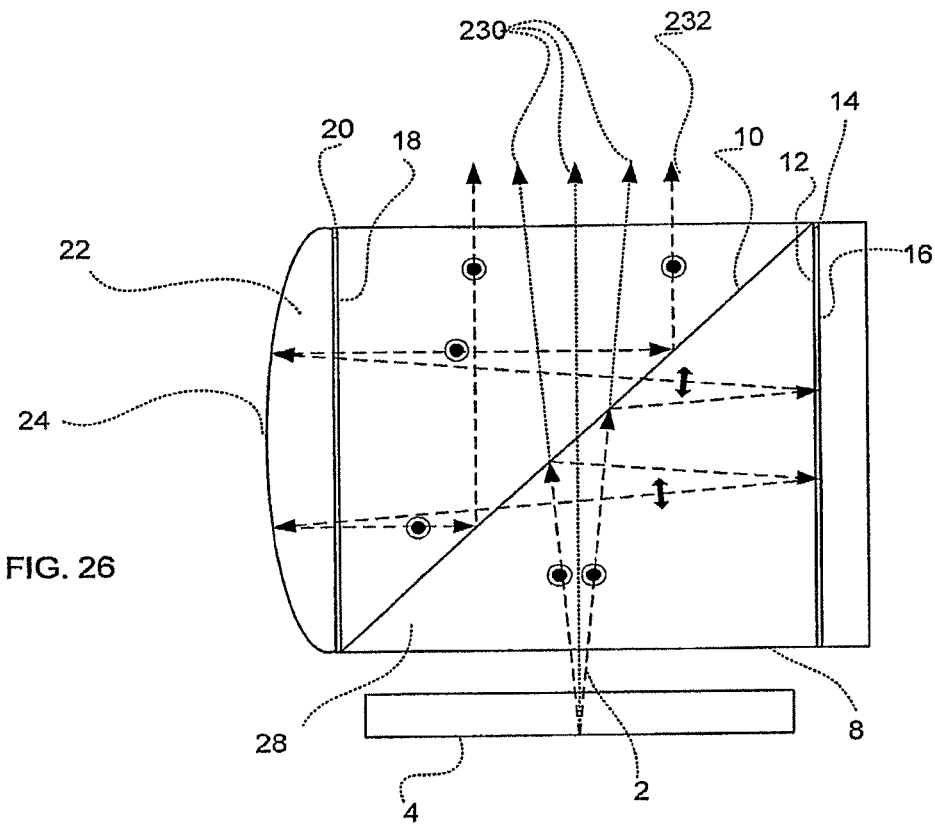
Figure 27:
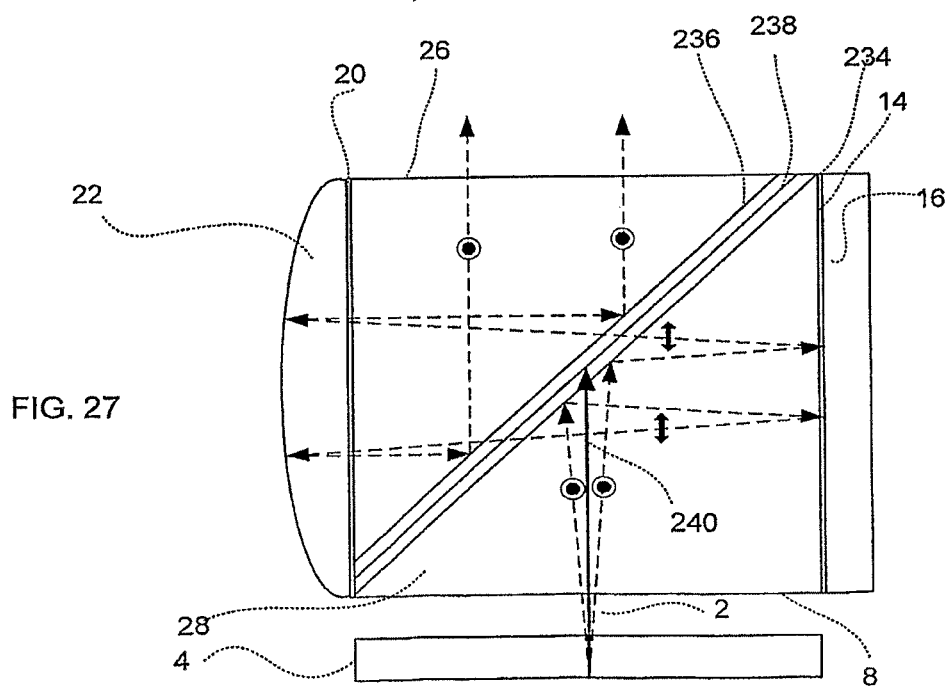
Figure 28:
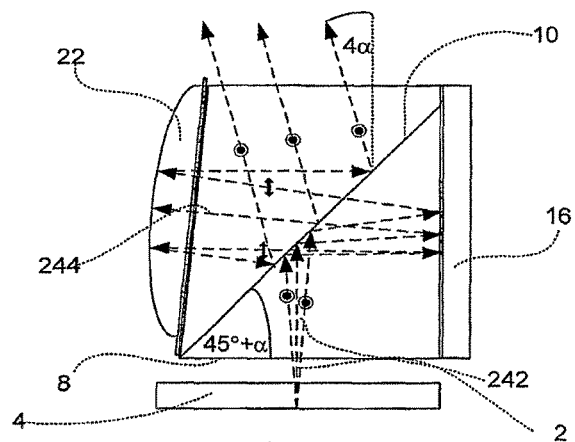
Figure 29:
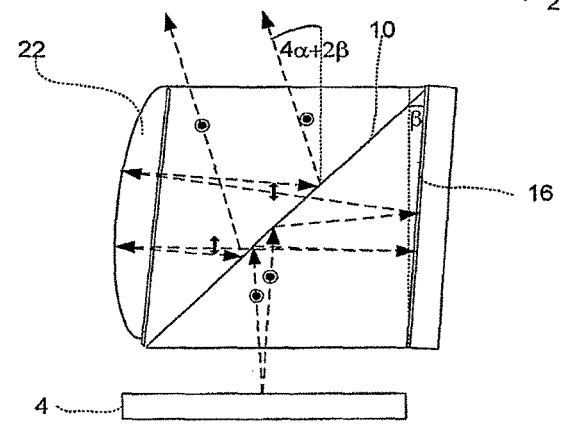
Figure 30:
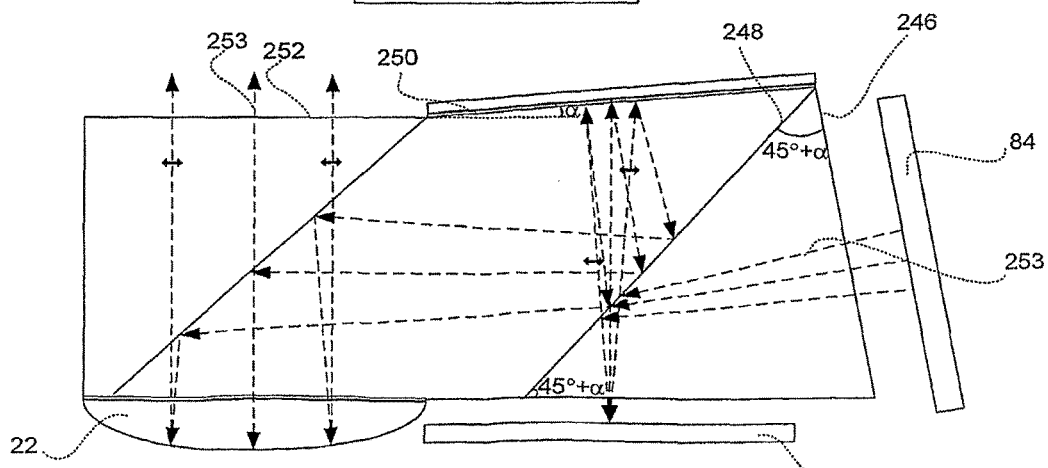
Figure 31:
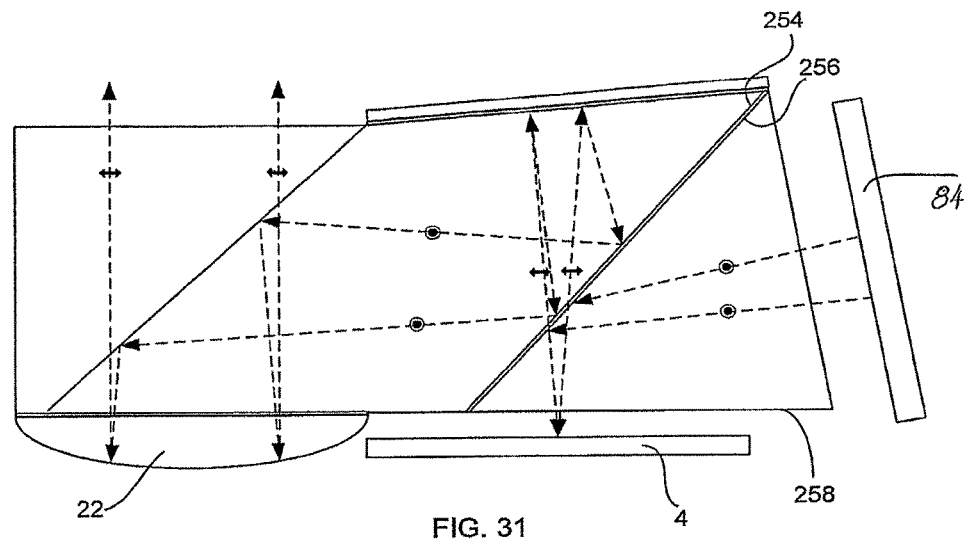
Figure 32:
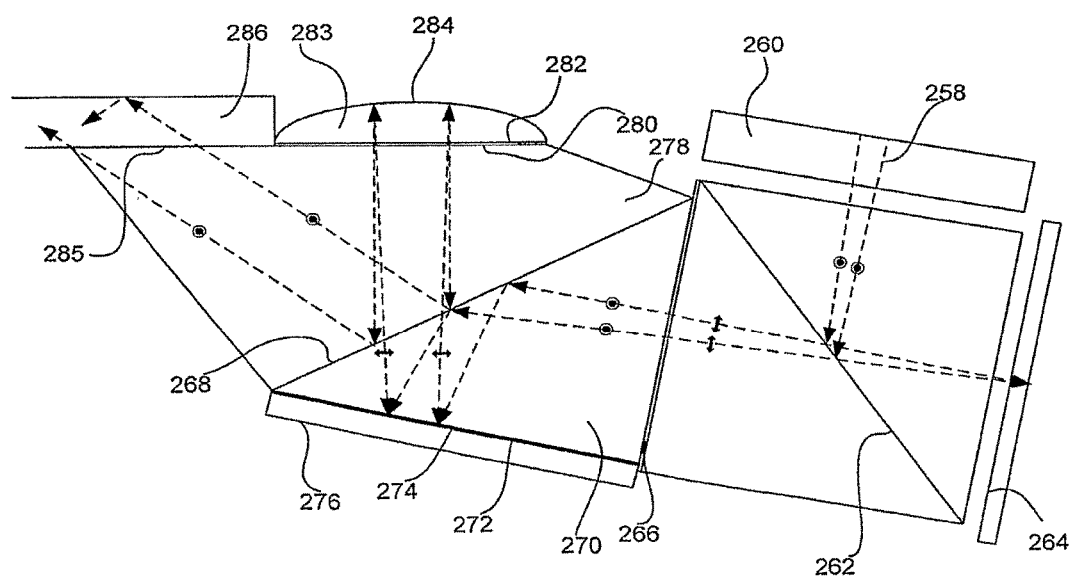
Figure 33:
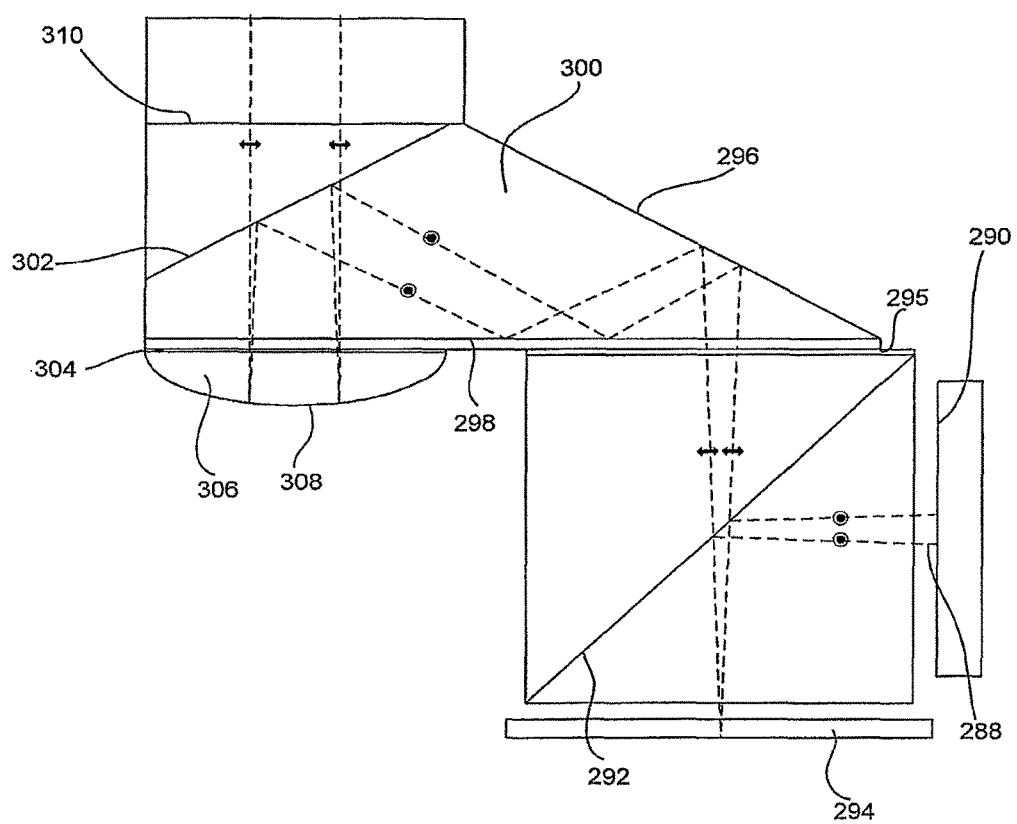
Figure 34:
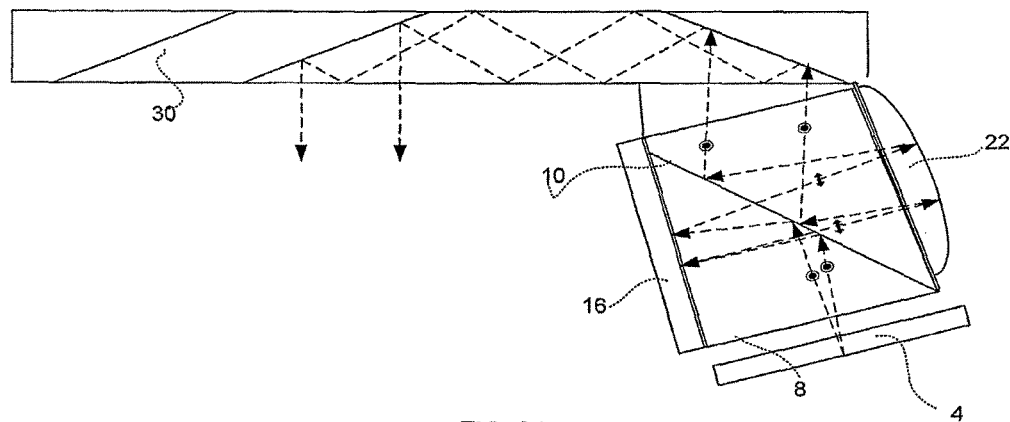
Figure 35:
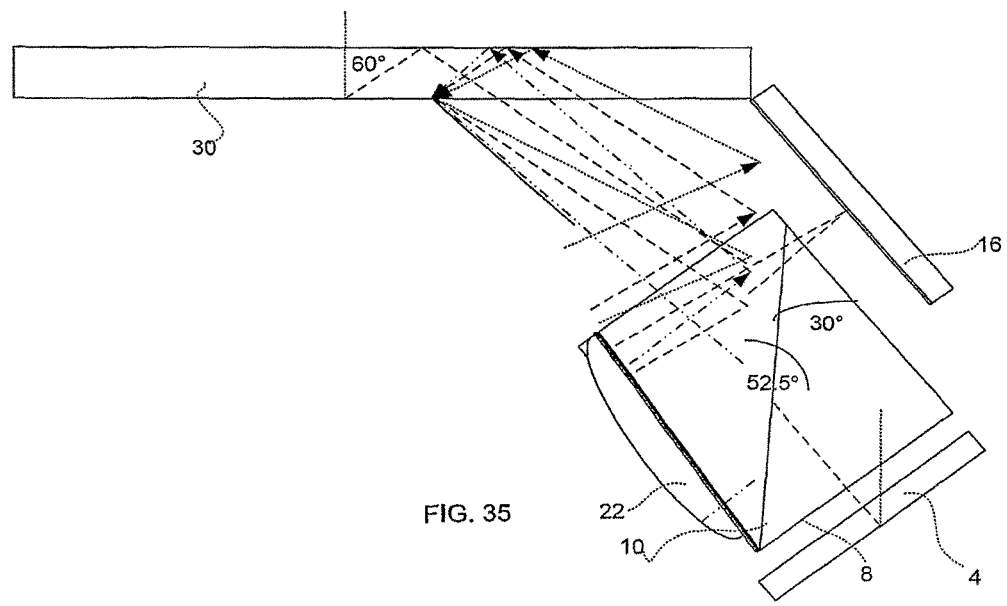
Figure 36:
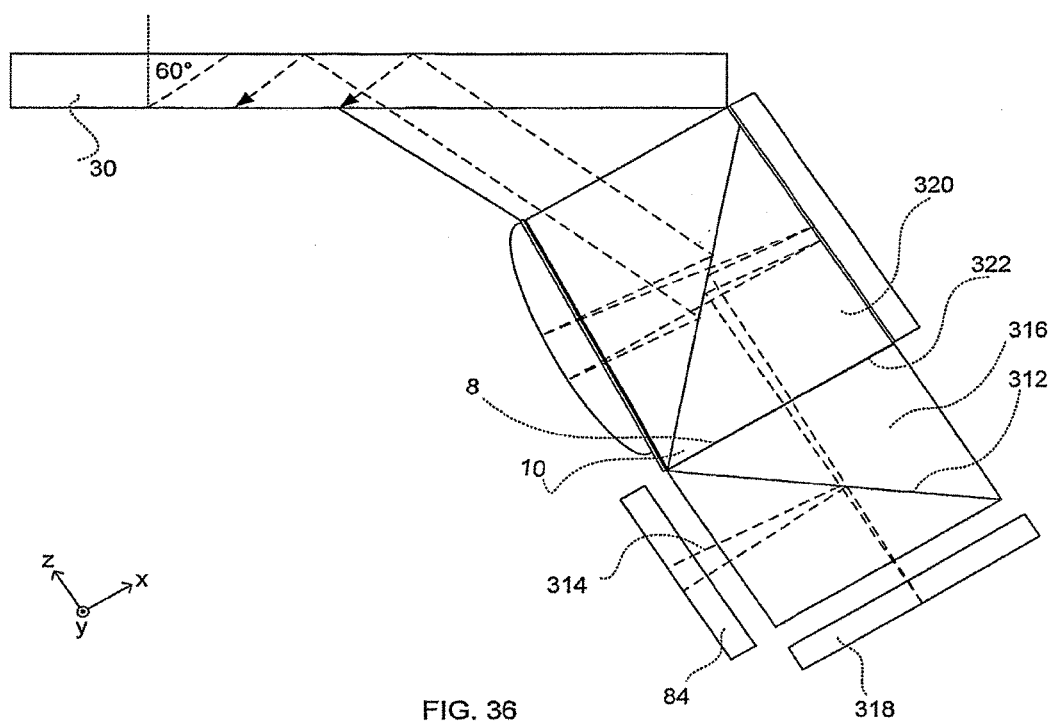
Figure 37:
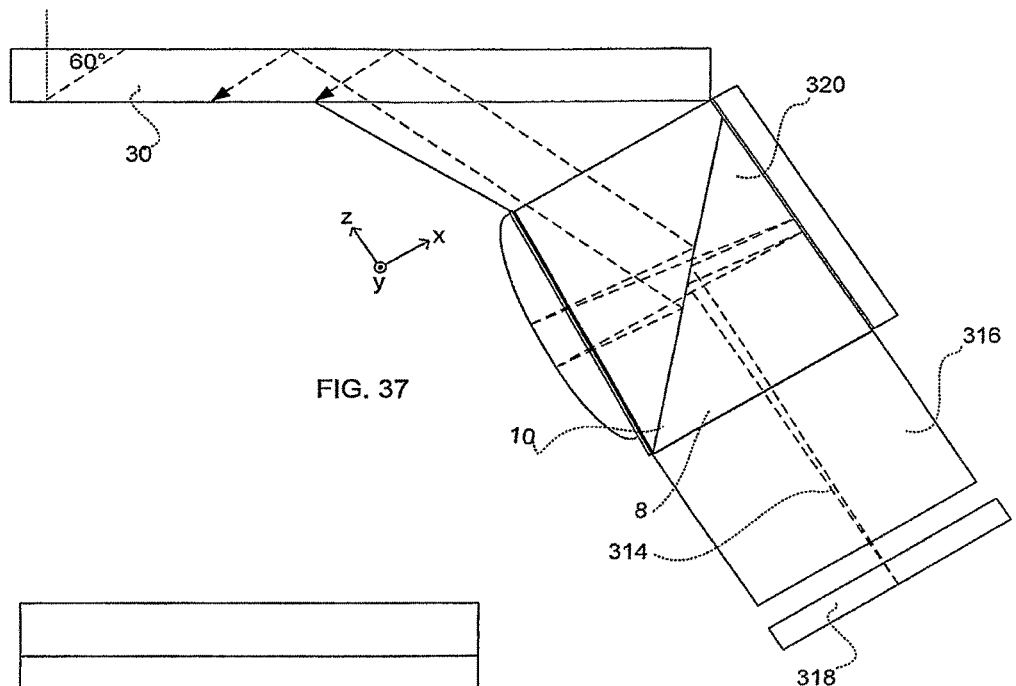
Figure 38:
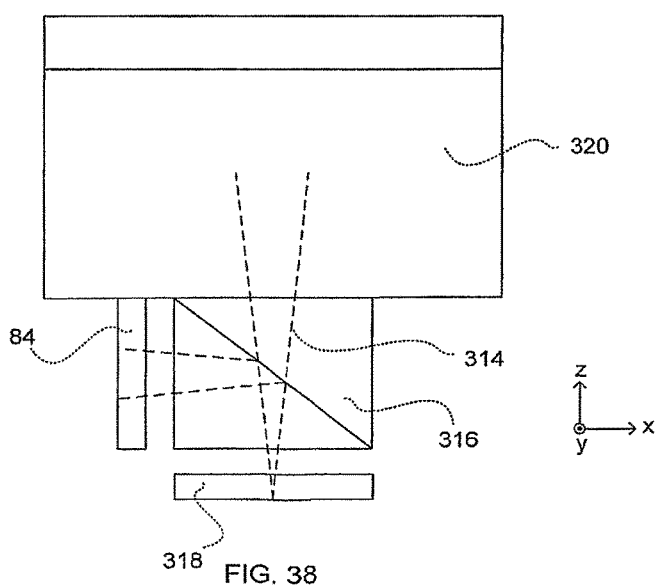
Figure 39:
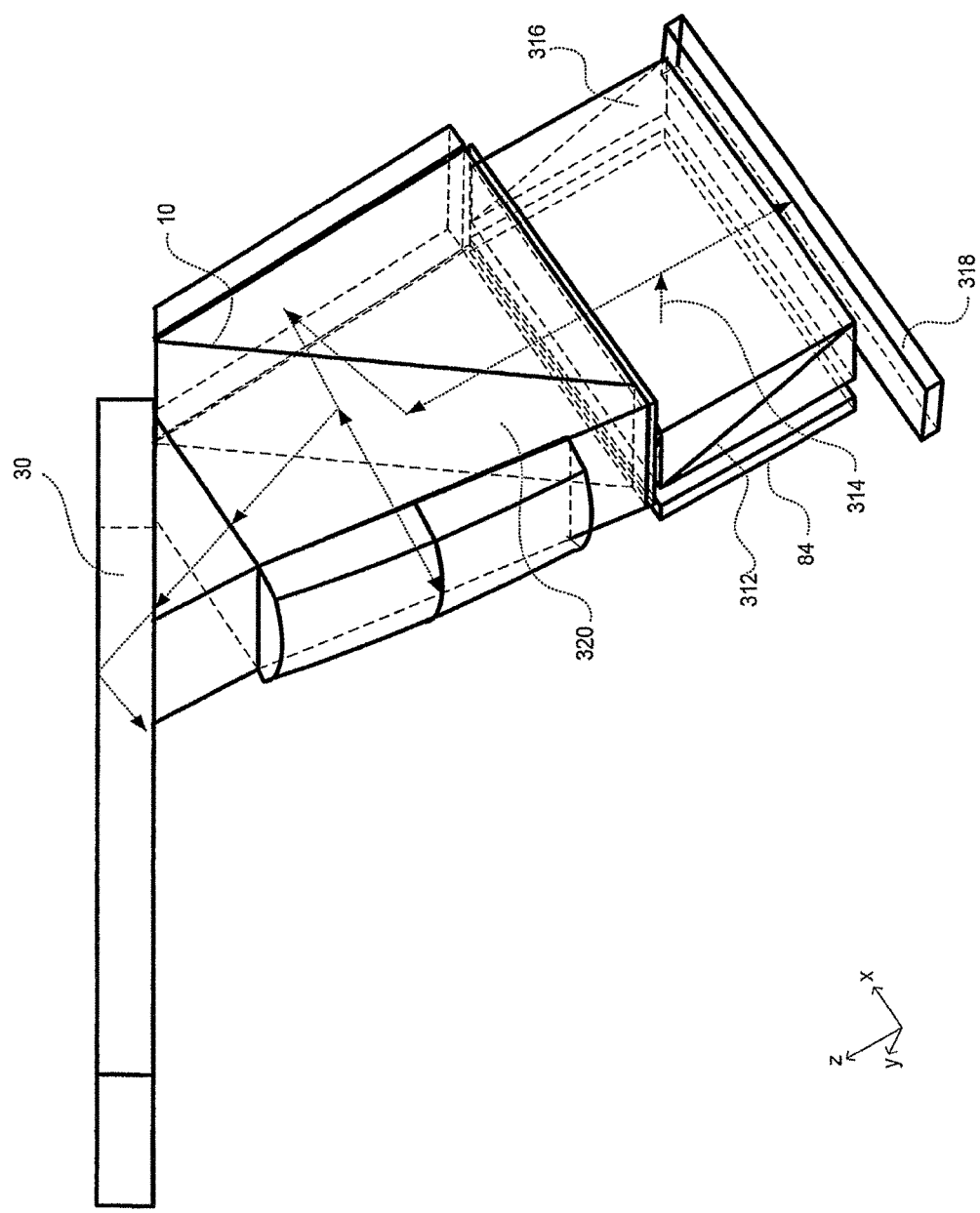
Figure 40:
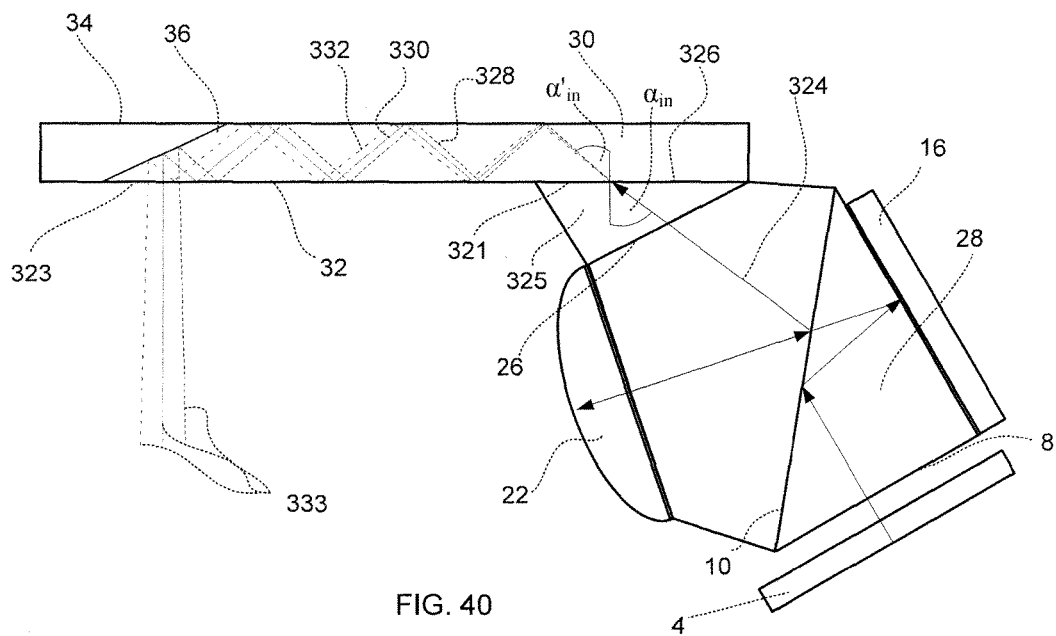
Figure 41:
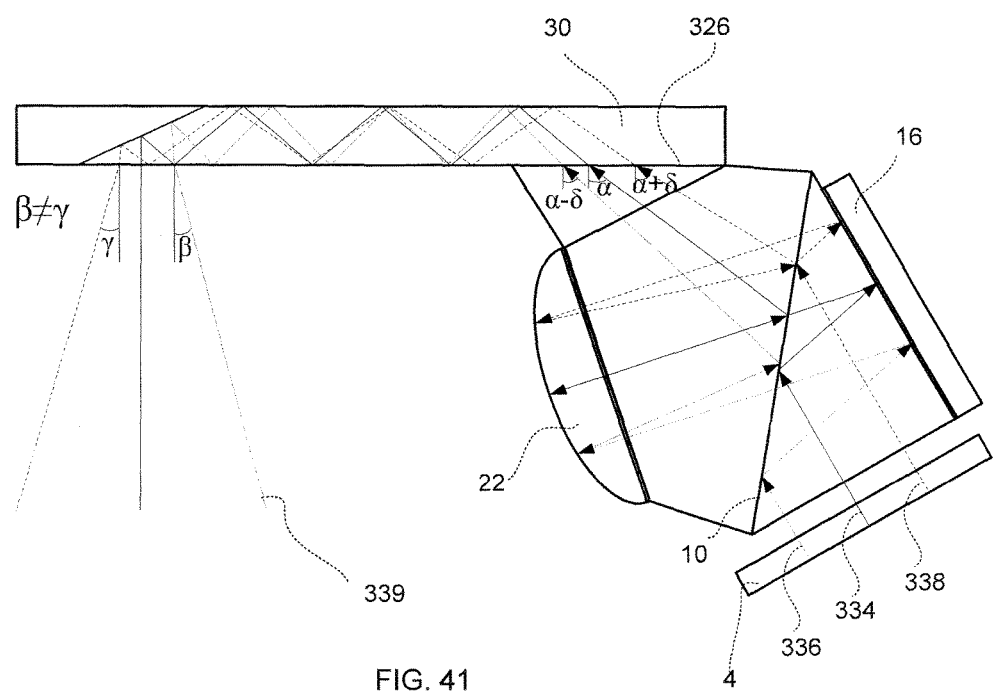
Figure 42:
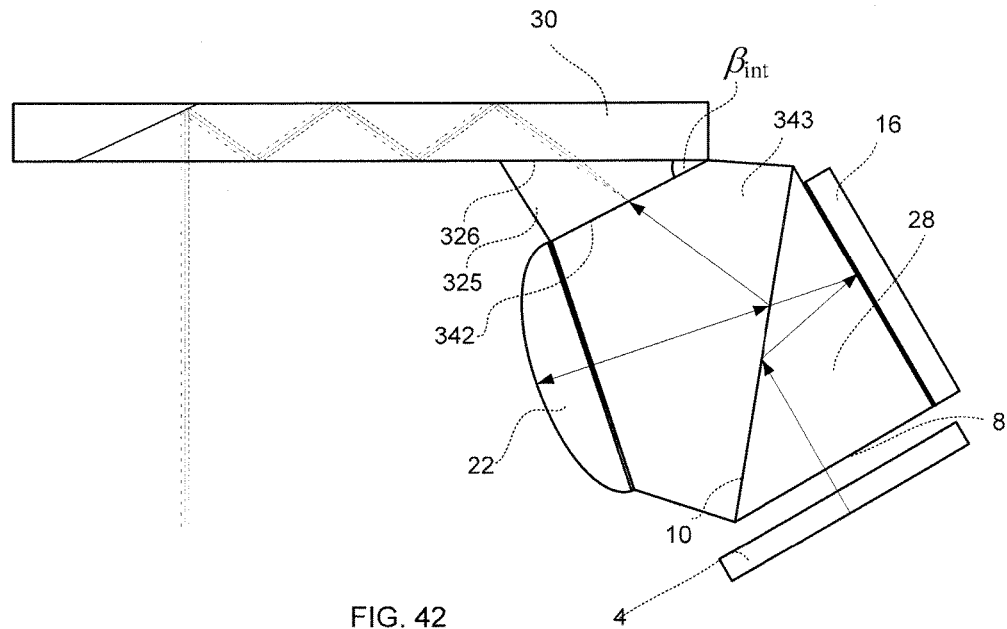
Figure 43:
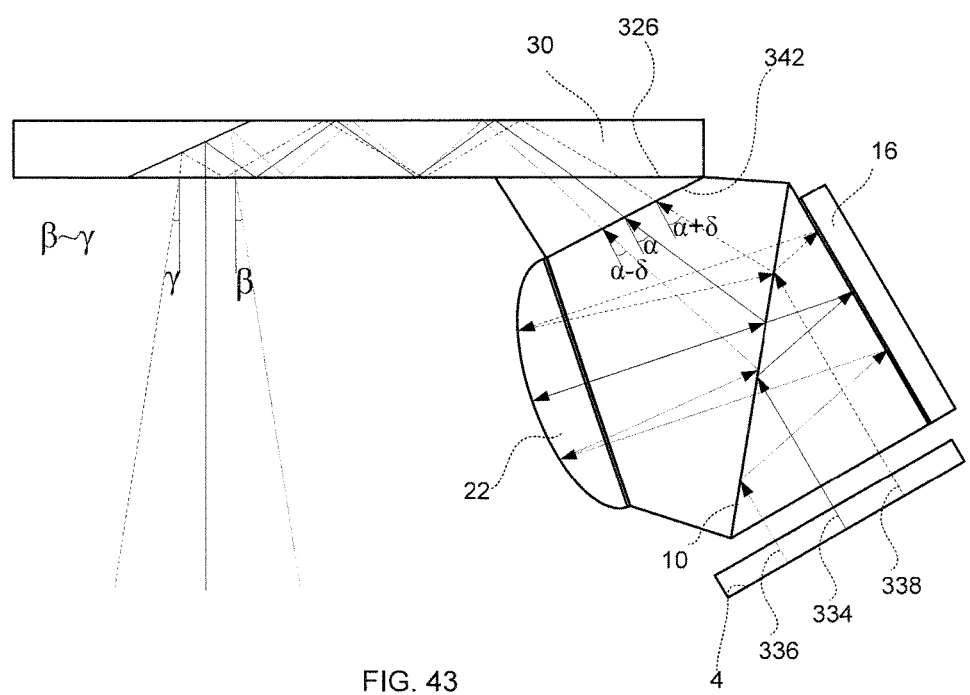
Figure 44:
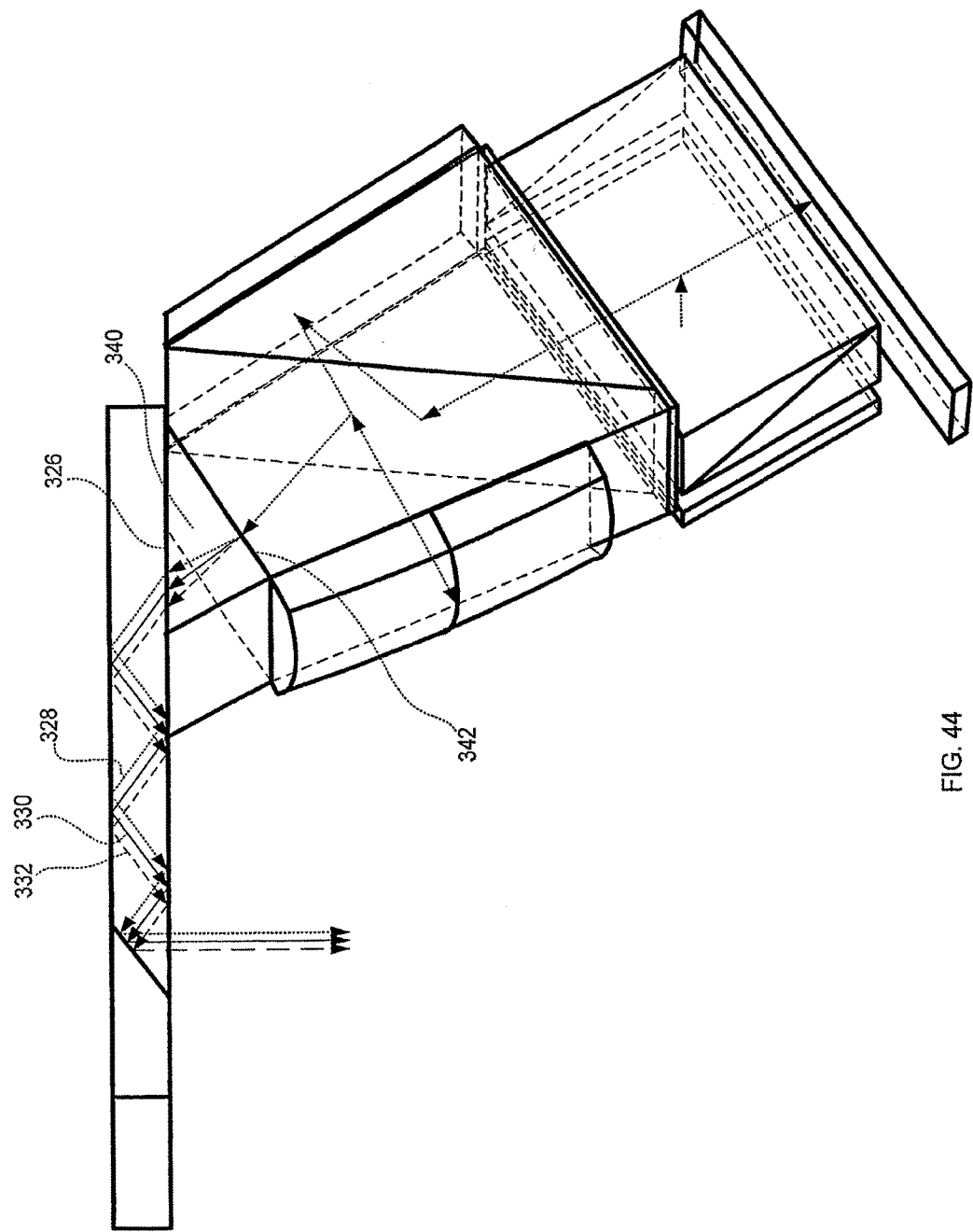
Figure 45:
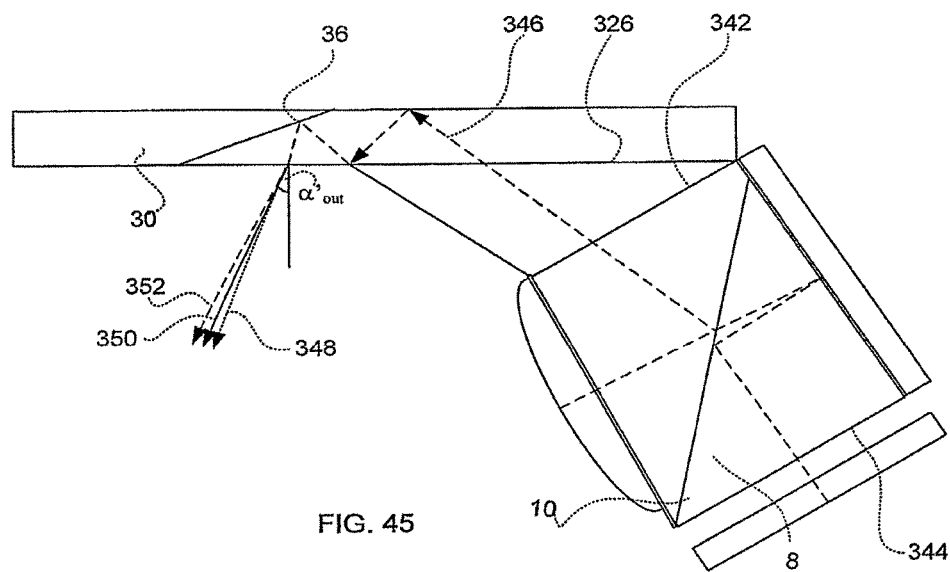
Figure 46:
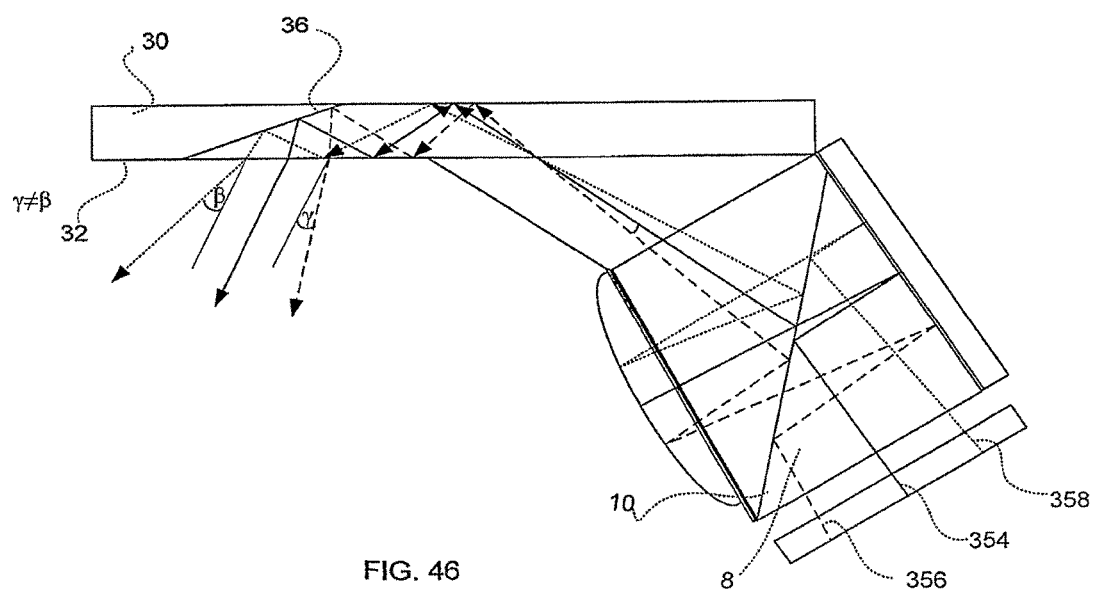
Figure 47:
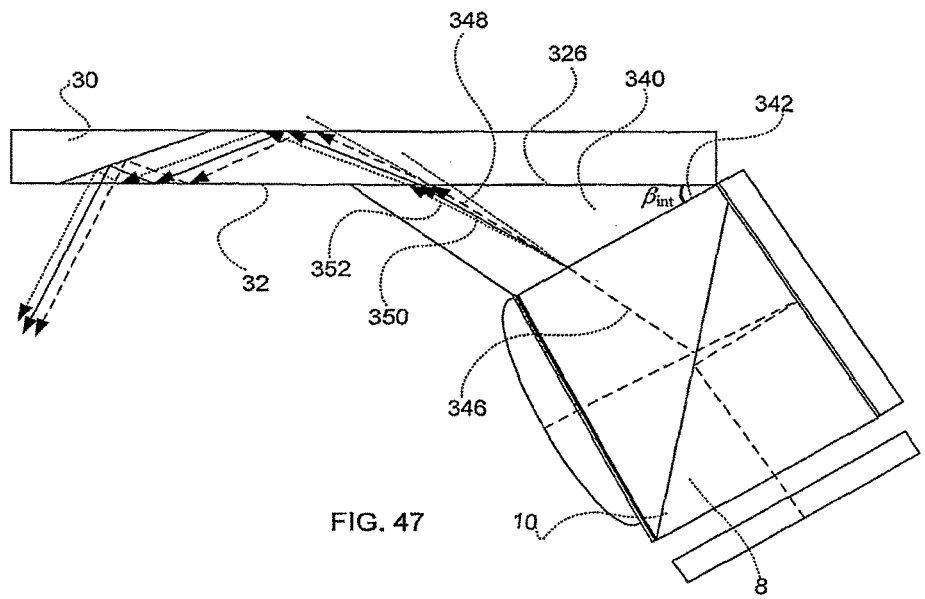
Figure 48:
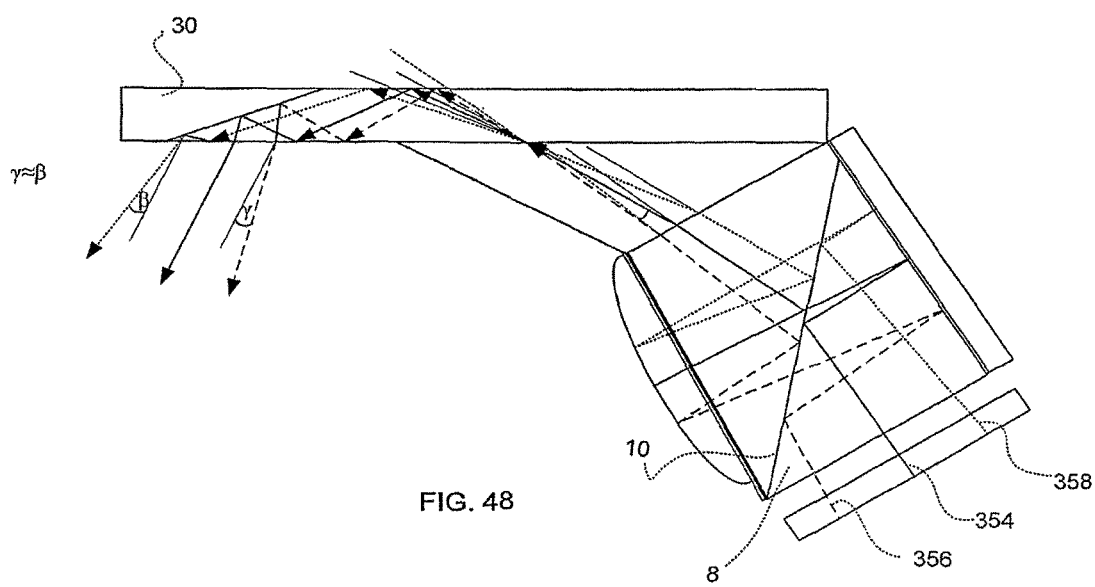
Figure 49:
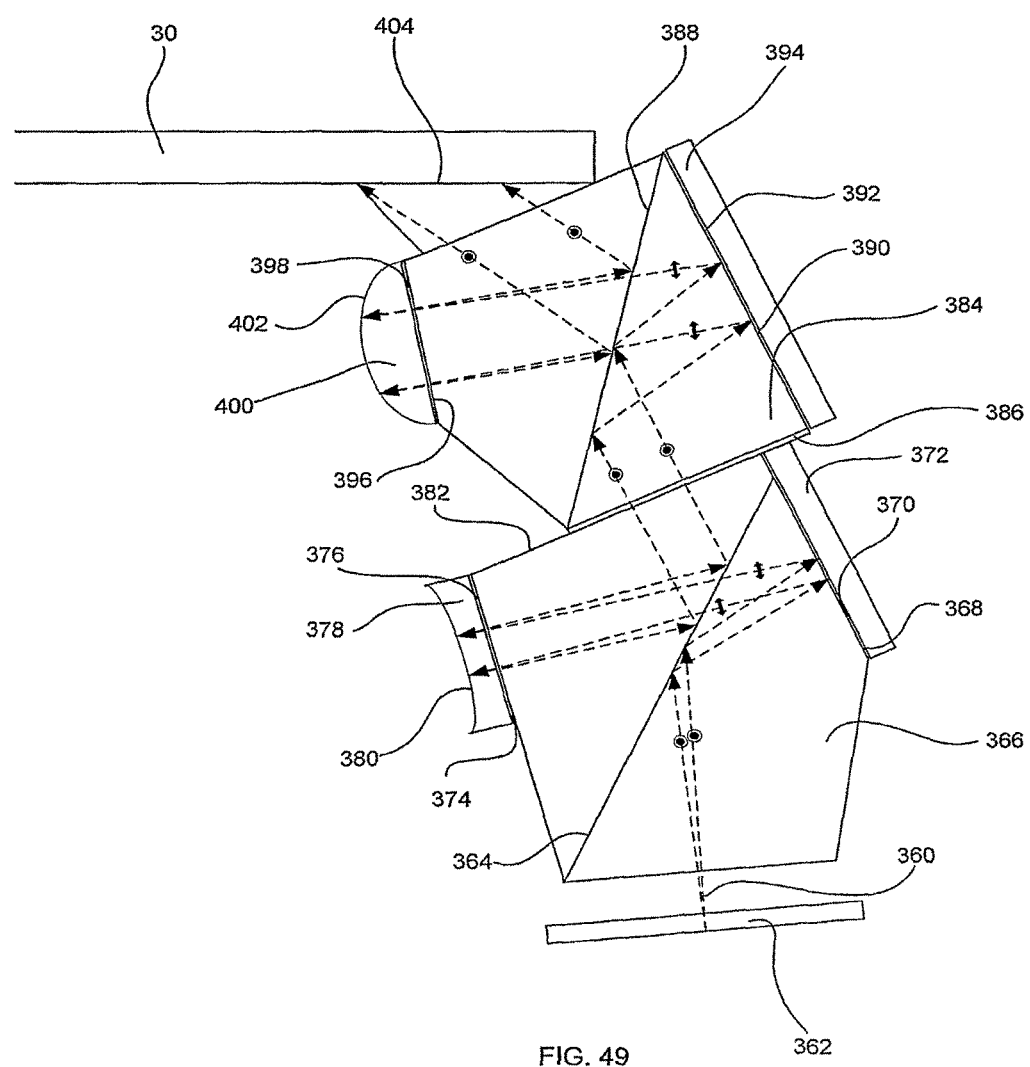
Figure 50:
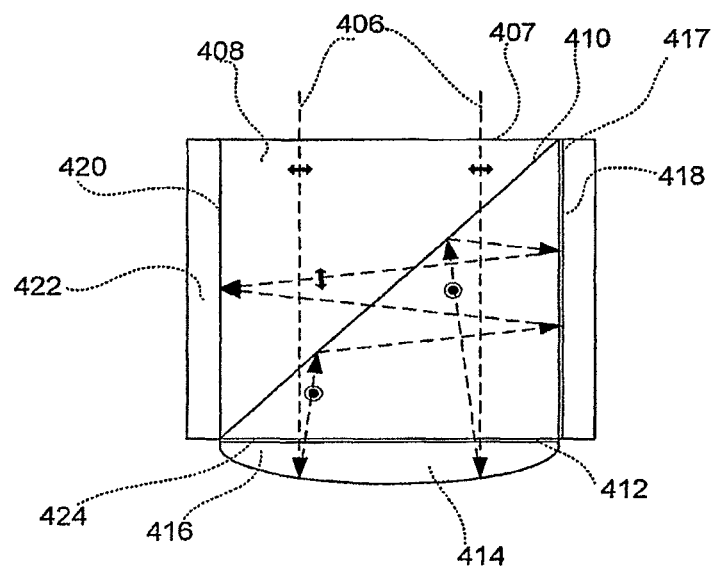
Figure 51:
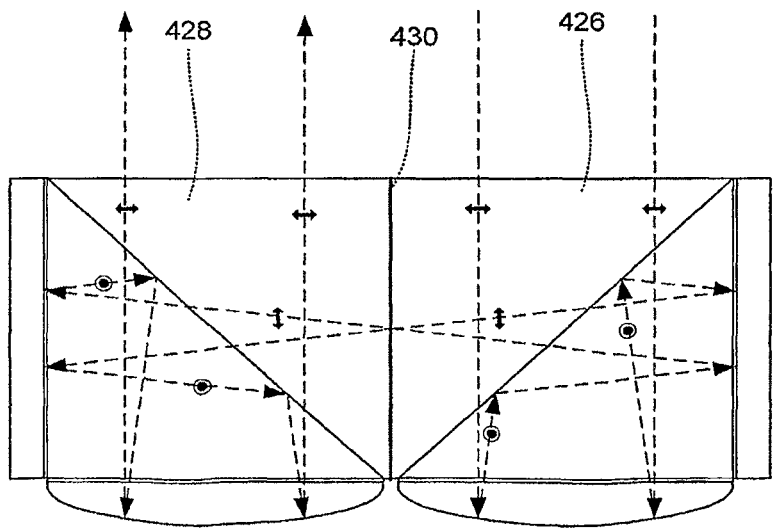
Figure 52:
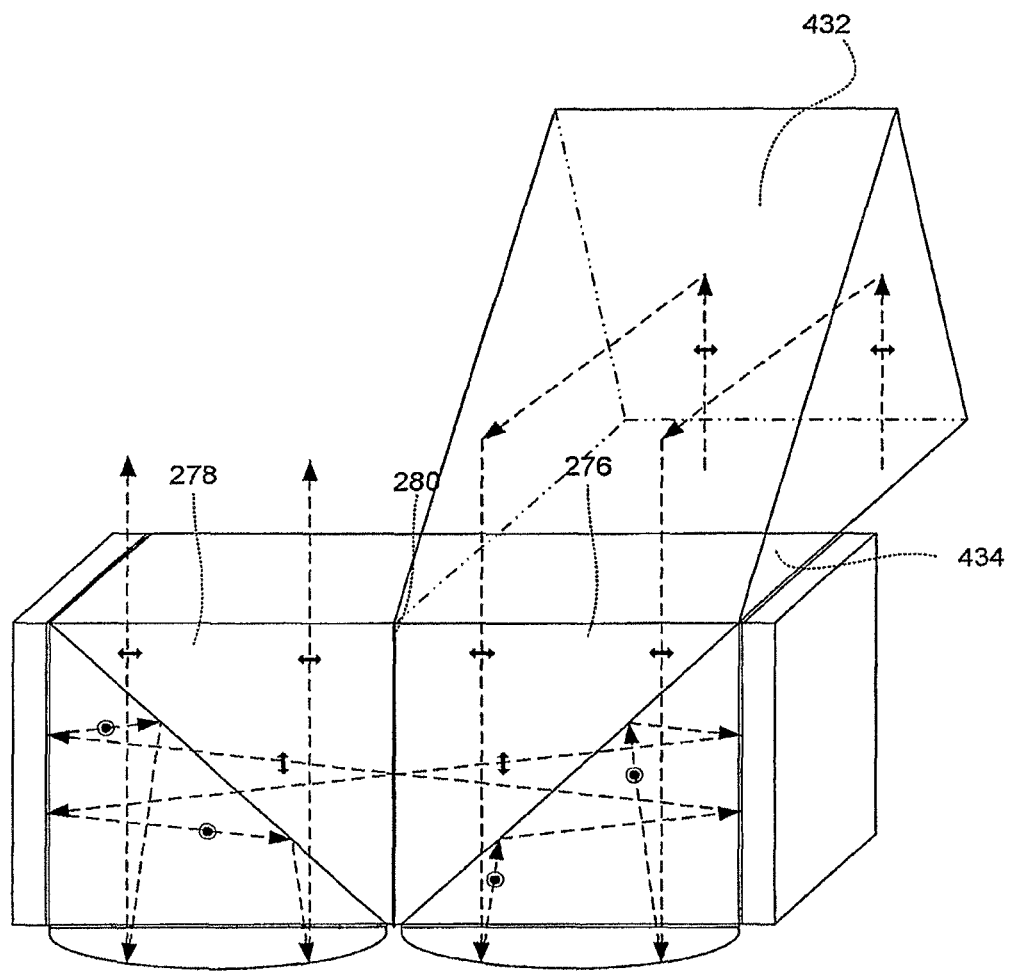

FIG. 13 is a schematic three-dimensional diagram illustrating yet another device for collimating input light-waves from an LCOS light source, in accordance with the present invention;

FIG. 14 is a schematic diagram illustrating a system for collimating input light-waves and coupling-in input light-waves from an LCOS light source into a substrate, in accordance with the present invention;

FIG. 15 is a schematic diagram illustrating another system for collimating input light-waves and coupling-in input light-waves from an LCOS light source into a substrate, in accordance with the present invention;

FIG. 16 is a schematic diagram illustrating an optical system for collimating input light-waves from a display light source utilizing a folding prism, in accordance with the present invention;

FIG. 17 is a schematic diagram illustrating an optical device for collimating input light-waves from an LCOS light source utilizing a folding prism, in accordance with the present invention;

FIG. 18 illustrates a span of optical rays coupled into a substrate;

FIG. 19 is a schematic diagram illustrating a system for coupling light into a substrate, in accordance with the present invention;

FIG. 20 is a schematic diagram illustrating a system for coupling light into a substrate utilizing a coupling prism, in accordance with the present invention;

FIG. 21 illustrates an optical system for collimating and coupling-in input light-waves from a single display light source into two separate substrates, in accordance with the present invention;

FIG. 22 illustrates a front view of an embodiment of an optical system for collimating and coupling-in input lightwaves from a single display light source into two separate substrates, in accordance with the present invention;

FIG. 23 illustrates an optical system for collimating and coupling-in input light-waves from two display light sources into two separate substrates, in accordance with the present invention;

FIG. 24 illustrates another optical system for collimating and coupling-in input light-waves from two display light sources into two separate substrates, utilizing an optical beamsplitter, in accordance with the present invention;

FIG. 25 illustrates an optical system for collimating and coupling-in input light-waves from a single display light source into two separate substrates, utilizing a polarizing beamsplitter and a dynamic half-wavelength retardation plate, in accordance with the present invention;

FIG. 26 is a schematic diagram illustrating an optical device for collimating input light-waves from a display light source, wherein a ghost image appears in the output image;

FIG. 27 is a schematic diagram illustrating an optical device for collimating input light-waves from a display light source, utilizing two polarizing beamsplitters and a linear polarizer, in accordance with the present invention;

FIG. 28 is a schematic diagram illustrating an optical device for collimating input light-waves from a display light source, wherein the output light-waves are rotated compared to the input light-waves, in accordance with the present invention;

FIG. 29 is a schematic diagram illustrating another optical device for collimating input light-waves from a display light source, wherein the output light-waves are rotated compared to the input light-waves, in accordance with the present invention;

FIG. 30 is a schematic diagram illustrating an optical device for collimating input light-waves from an LCOS light source, wherein the output light-waves are rotated compared to the input light-waves, in accordance with the present invention;

FIG. 31 is a schematic diagram illustrating another optical device for collimating input light-waves from an LCOS light source, wherein the output light-waves are rotated compared with the input light-waves, in accordance with the present invention;

FIG. 32 is a schematic diagram of an optical device for collimating input light-waves from an LCOS light source, including a beamsplitter for exclusively illuminating the display source, in accordance with the present invention;

FIG. 33 is a schematic diagram illustrating yet another embodiment of an optical device for collimating input light-waves from an LCOS light source, including a beamsplitter for exclusively illuminating the display source, in accordance with the present invention;

FIG. 34 is a schematic diagram illustrating an optical device for collimating and coupling-in input light-waves from a display light source into a substrate, wherein the output light-waves are rotated compared to the input light-waves, in accordance with the present invention;

FIG. 35 is a schematic diagram illustrating another embodiment of an optical device for collimating and coupling-in input light-waves from a display light source into a substrate, wherein the output light-waves are rotated compared with the input light-waves, in accordance with the present invention;

FIG. 36 is a schematic diagram illustrating an optical device for collimating and coupling-in input light-waves from an LCOS light source into a substrate, wherein the output light-waves are rotated compared with the input light-waves, in accordance with the present invention;

FIGS. 37 to 39 are, respectively, top, side and three-isometric views of an optical device for collimating and coupling-in input light-waves from a display light source into a substrate, in accordance with the present invention;

FIG. 40 is a schematic diagram illustrating an optical device for collimating input light-waves from a display light source into a substrate, wherein the collimating optical device and the substrate are fabricated from different optical materials, in accordance with the present invention;

FIG. 41 is a schematic diagram illustrating the distortion effect when the collimating optical device and the substrate are fabricated from different optical materials;

FIG. 42 is a schematic diagram illustrating a system for compensating for the chromatic aberration of an optical system which is fabricated from two different materials, in accordance with the present invention;

FIG. 43 is a schematic diagram illustrating a system for compensating for the distortion of an optical system which is fabricated from two different materials, in accordance with the present invention;

FIG. 44 is a three-dimensional schematic diagram illustrating a system for compensating for the chromatic aberration of an optical system which is fabricated from two different materials, in accordance with the present invention;

FIG. 45 is a schematic diagram illustrating the chromatic aberration when a central trapped light-wave is coupled out from the substrate at an output direction which deviates with respect to the normal of the major plane of the substrate;

FIG. 46 is a schematic diagram illustrating distortion when a central trapped light-wave is coupled out from the substrate at an output direction which deviates with respect to the normal of the major plane of the substrate;

FIG. 47 is a schematic diagram illustrating a system for compensating for the chromatic aberration of an optical system when the output direction deviates with respect to the normal of the major plane of the substrate, in accordance with the present invention;

FIG. 48 is a schematic diagram illustrating an optical device for compensating for the distortion of an optical system when the output direction deviates with respect to the normal of the major plane of the substrate, in accordance with the present invention;

FIG. 49 is a schematic diagram illustrating a device for collimating input light-waves from a display light source into an substrate, by utilizing a telephoto system, in accordance with the present invention;

FIG. 50 is a schematic diagram illustrating an optical device having a focusing lens, in accordance with the present invention;

FIG. 51 is a schematic diagram illustrating an optical system having a unity magnification telescope, in accordance with the present invention, and FIG. 52 is a schematic diagram illustrating an optical system having a unity magnification telescope, including an inverting prism in accordance with the present invention.

DETAILED DESCRIPTION OF PREFERRED EMBODIMENTS

Figure 1:
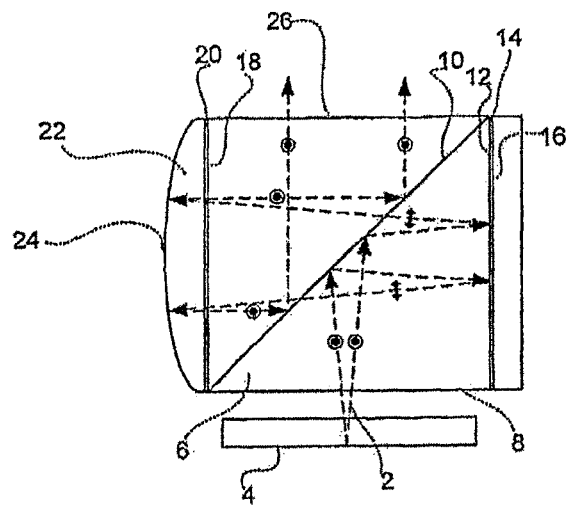

In the following there will be described superior structures of optical devices that are more compact than the prior art devices, having various configurations suitable for matching preferred outlines of optical systems, while still maintaining desired optical properties of the system. In such a structure, which exploits the fact that in most microdisplay light sources such as LCDs or LCOS light sources, the light is linearly polarized, as illustrated in FIG. 1. As shown, the s-polarized input light-waves 2 from the display light source 4 are coupled into a light-guide (optical device) 6, which is usually composed of a light-waves transmitting material, through its entrance surface 8. Following reflection-off of a polarizing beamsplitter 10, the light-waves are coupled-out of the substrate through an external surface 12 of the light-guide 6. The light-waves then pass through a quarter-wavelength retardation plate 14, reflected by a reflecting optical element 16, e.g., a flat mirror, return to pass again through the retardation plate 14, and re-enter the light-guide 6 through external surface 12. The now p-polarized light-waves pass through the polarizing beamsplitter 10 and are coupled out of the light-guide through an external surface 18 of the light-guide 6. The light-waves then pass through a second quarter-wavelength retardation plate 20, collimated by a component 22, e.g., a lens, at its reflecting surface 24, return to pass again through the retardation plate 20, and re-enter the light-guide 6 through external surface 18. The now s-polarized light-waves reflect-off the polarizing beamsplitter 10 and exit the light-guide through the exit surface 26. The reflecting surfaces 16 and 24 can be materialized either by a metallic or by a dielectric coating.

Figure 2:
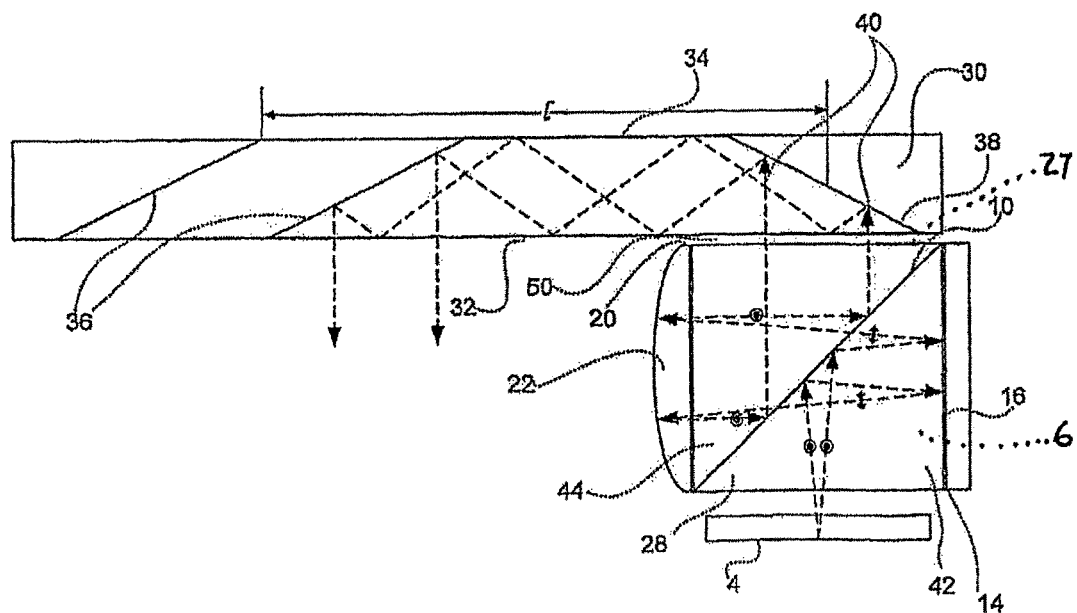

FIG. 2 illustrates how a LCCD 28 constituted by the components detailed with respect to FIG. 1, can be combined with a substrate 30, to form an optical system. Such a substrate 30 typically includes at least two major surfaces 32 and 34 and edges, one or more partially reflecting surface 36 and an optical element 38 for coupling light thereinto. The output light-waves 40 from the LCCD 28 enter the substrate 30 through its lower surface 32. The incoming light-waves (vis-a-vis the substrate 30) are reflected from optical element 38 and trapped in the substrate as illustrated in FIG. 2. Now, the LCCD 28, comprising the display light source 4, the folding prisms 42 and 44, the polarizing beamsplitter 10, the retardation plates 14 and 20 and the reflecting optical element 16 and reflecting collimating component 22, can easily be integrated into a single mechanical module which can be assembled independently of the substrate, with fairly relaxed mechanical tolerances. In addition, the retardation plates 14 and 20 and the reflecting optical elements 16 and 22 could be cemented together respectively to form single elements. Alternatively, other methods could be used to combine these into a single element, such as laminating a quarter-wavelength film onto the front surface of the reflecting optical element 16 and reflecting collimating component 22. Furthermore, all the optical elements of the LCCD 28, apart from the display light source 4, could be cemented together to form a single optical module. Regarding the display light source, it is usually required to keep an air gap between the LCCD and the display light source, in order to enable a focusing mechanism, however, there are systems wherein the required focal distance of the LCCD is known. For instance, for optical systems wherein the image light-waves are coupled into a substrate, the optical waves should be collimated by the LCCD to infinity. If, in addition, the focal depth of the collimating component is large enough to accommodate the various fabrication and assembly tolerances of the LCCD, then it is possible to locate the display light source 4 with regard to the LCCD 28 at a pre-defined distance. In that case, the display source could be attached, e.g., cemented, to the LCCD 28 utilizing an intermediate transparent plate 46 (FIG. 3), having a thickness according to the required focal distance of the LCCD.

Figure 3:
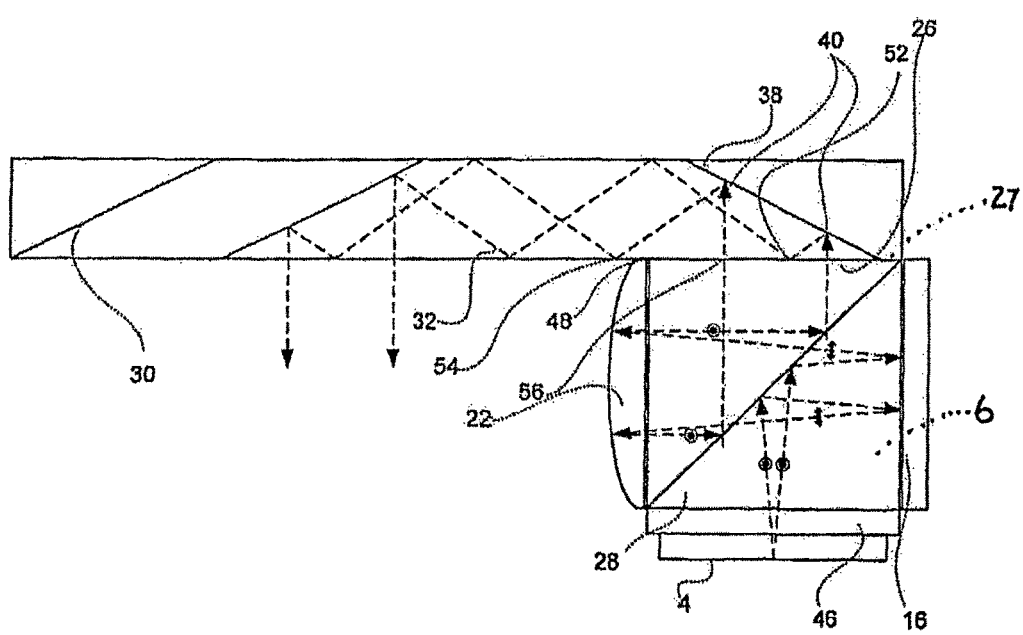

It would be advantageous to attach all the various components of the LCCD 28 to the substrate 30, to form a single compact element with a much simpler mechanical module. FIG. 3 illustrates such a module wherein the exit surface 26 of the LCCD 28 is cemented, at the interface plane 48, to the lower surface 32 of the substrate 30. The main problem of this configuration is that the attaching procedure cancels the previously existing air gap 50 (illustrated in FIG. 2) between the substrate 30 and the LCCD 28. This air gap is essential for trapping the input light-waves 40 inside the substrate 30. As illustrated in FIG. 3, the trapped light-waves 40 should be reflected at points 52 and 54 of the interface plane 48. Therefore, a reflecting coating should be applied at this plane, either at the major surface 32 of the substrate 30 or at the upper exit surface 26 of the LCCD 28. A simple reflecting coating cannot, however, be easily applied, since these surfaces should also be transparent to the light-waves that enter and exit the substrate 30 at the exemplary points 56. The light-waves should pass through plane 48 at small incident angles, and reflect at higher incident angles. In the example illustrated, the passing incident angles are between 0° and 15° and the reflecting incident angles are between 47° and 80°.

Figure 4:
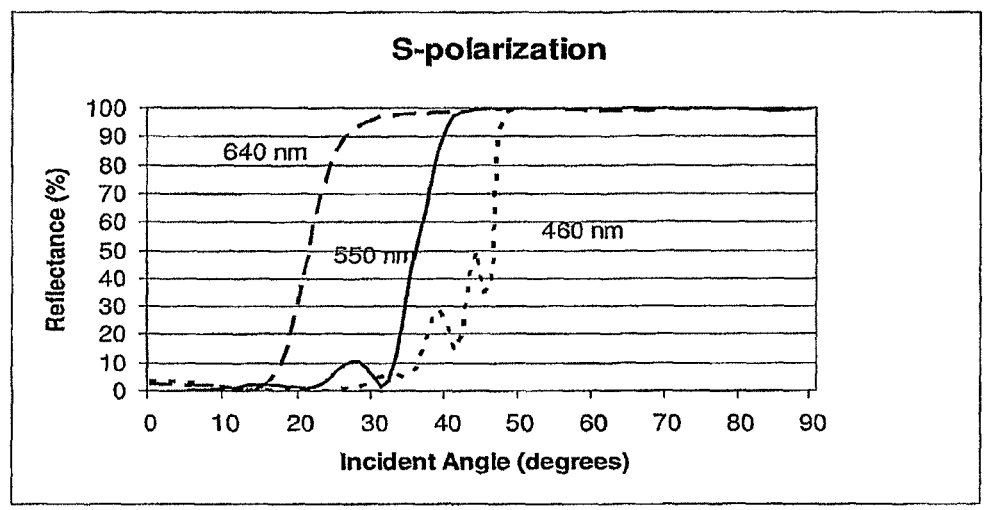
Figure 5:
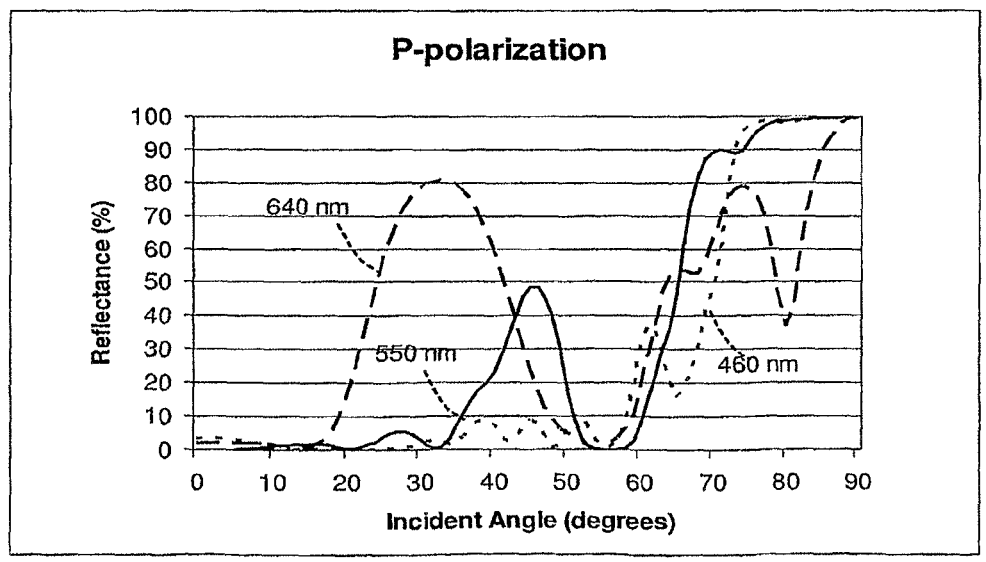

FIGS. 4 and 5 illustrate, for s- and p-polarization respectively, the reflectance curves as functions of the incident angles for three representative wavelengths in the photopic region: 460 nm, 550 nm and 640 nm. As shown in FIG. 4, it is possible to achieve the required behavior of high reflectance (above 95%) at large incident angles and low reflectance (below 5%) at small incident angles, for s-polarized light-waves. For p-polarized light-waves, however, as illustrated in FIG. 5, it is impossible to achieve high reflectance at incident angles between 50° and 70°, due to the proximity to the Brewster angle.

In the system illustrated in FIG. 3, the light-waves from the display light source, as well as the reflected light-waves of the coupling mirror 38, which impinge on the points 52 and 54, are s-polarized and the required reflectance could be achieved. There are situations, however, where the light-waves from the display light source are linearly p-polarized and the major axis of the grid is rotated by 90°, compared to that of FIGS. 1 and 2, i.e., the polarizing beamsplitter is oriented here to reflect the p-polarization and transmit the s-polarization.

Figure 6:
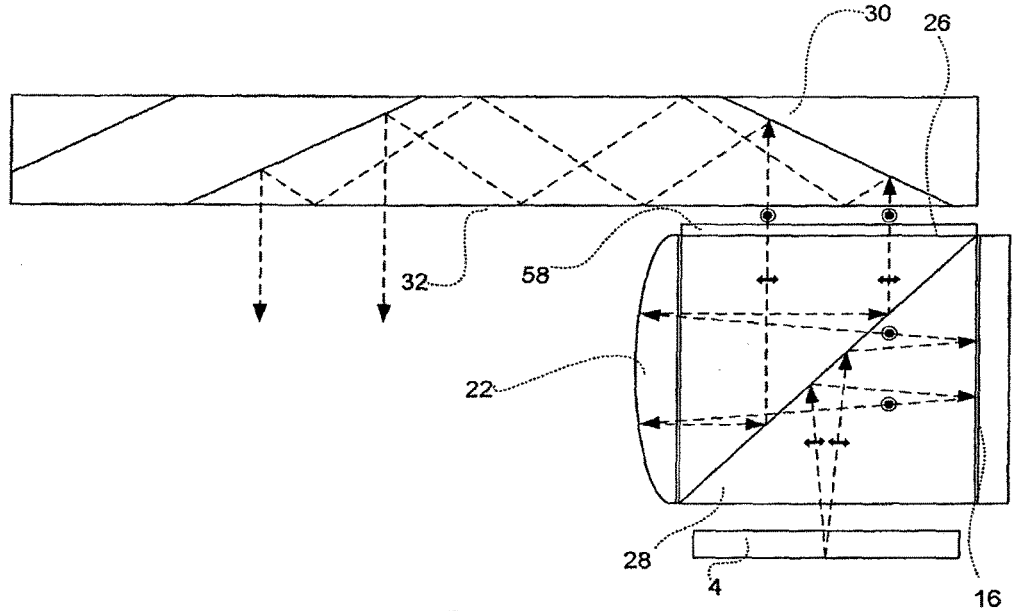

FIG. 6 illustrates a device wherein a half-wavelength retardation plate 58 is disposed between the upper surface 26 of the LCCD 28 and the exit surface 32 of the substrate 30. When passing through the plate 58 the polarization of the light-waves is rotated and the now s-polarized light-waves are coupled into the substrate.

A difficulty still existing in the configurations of FIGS. 3 and 6 is that the substrate 30 and the LCCD 28, are assembled from several different components. Since the fabrication process usually involves cementing optical elements, and, since the required angular-sensitive reflecting coating 27 is applied to the surface of the light-guide only after the bodies of the substrate 30 and the LCCD 28 are complete, it is not possible to utilize the conventional hot-coating procedures that may damage the cemented areas. Novel thin-film technologies, as well as ion-assisted coating procedures, can also be used for cold processing. Eliminating the need to heat parts, allows cemented parts to be coated safely.

Figure 7:
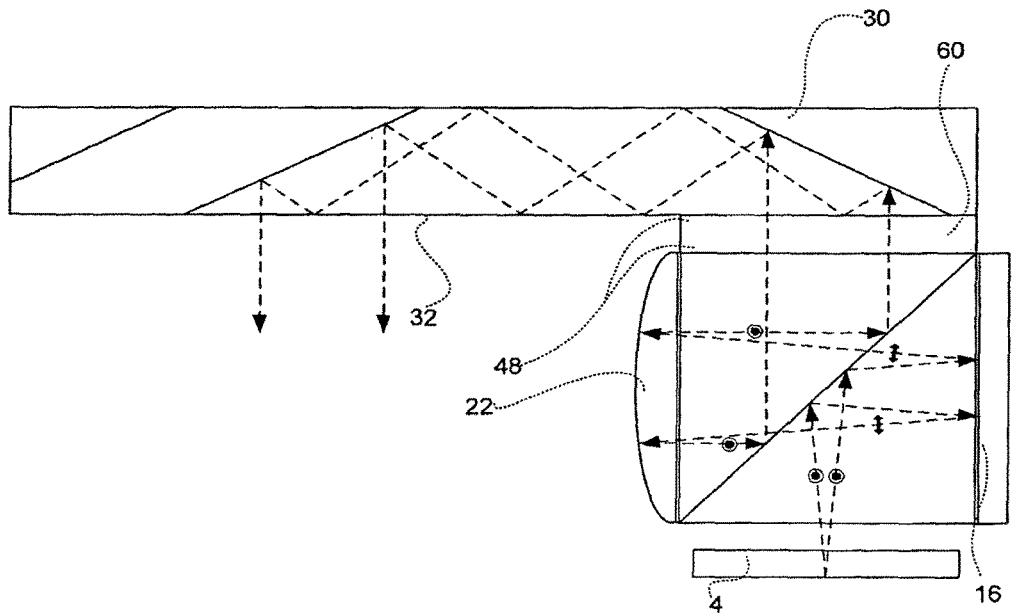

An alternative structure of a device is illustrated in FIG. 7. Here, transparent plate 60 is placed at the interface plane 48. Now, the required coating can simply be applied to the upper surface of this light-guide, which is adjacent to the substrate 30, utilizing conventional hot-coating procedures and then cementing it at the proper place.

In the devices illustrated in FIGS. 1 to 3 and 6 to 7, it is assumed that the optical path inside the LCCD 28 from the display light source 4 to the reflecting surface 24 of the component 22 is the required focal length of the collimating component. Usually, this can be achieved by controlling the lateral dimensions of the LCCD 28, however, there are systems, particularly for eyeglasses systems, where it is desired to minimize the lateral dimension between surface 12 and surface 18 of the LCCD 28. That is, to reduce the width of the LCCD 28 at the expense of increasing the distance between the display light source and the substrate 30. The lateral dimensions of the folding prism could be reduced, as long as the entire FOV of the image can be coupled into the LCCD with no vignetting. In that case, however, the optical path between the display light source 4 and the collimating component 22 is reduced, and therefore, the output light-waves from the LCCD 28 are no longer collimated.

As illustrated in FIG. 8, in order to compensate for this defocusing, a blank plate 62 is placed between the display light source 4 and the lower prism 42 of the LCCD 28. Preferably, in order to simplify the final assembly of the system, as explained above with reference to FIGS. 6 and 7, the plate 62 is optically cemented to the lower prism 42 at the interface plane 64. As shown, even though the lateral dimension of the LCCD 28 has been reduced, the marginal waves 66 and 68 are collimated by the LCCD 28 to the exit pupil 70, without any obstruction.

In the systems illustrated hereinbefore, only a single spherical converging lens is utilized. For some optical schemes that may be sufficient, however, for other systems with wide FOVs and large input apertures, a better optical quality may be required. One approach to improve the optical properties of the system is to exploit either aspheric or even aspheric-diffractive lenses. Another approach is to utilize more than one reflecting optical element.

In the optical device shown in FIG. 9, the planar reflecting surface 16 (of FIG. 1) is replaced by a second converging lens 72. The light-waves that pass through the quarter-wavelength retardation plate 14 of FIG. 1 are partially collimated by collimating component 72, e.g., a lens, at its reflecting surface 74. The partially collimated light-waves return to pass again through the retardation plate 14, and reenter the light-guide 6 through surface 12. The now p-polarized light-waves pass through the polarizing beamsplitter 10 and are coupled-out of the light-guide through surface 18 of the light-guide. The light-waves then pass through the second quarter-wavelength retardation plate 20, and are completely collimated by the component 22 at its reflecting surface 24. Another benefit of utilizing two collimating components in the LCCD 28 is that the required focal length can be achieved with a shorter optical path between the display source and the output surface of the LCCD 28, by exploiting an appropriate telephoto design.

Figure 10:
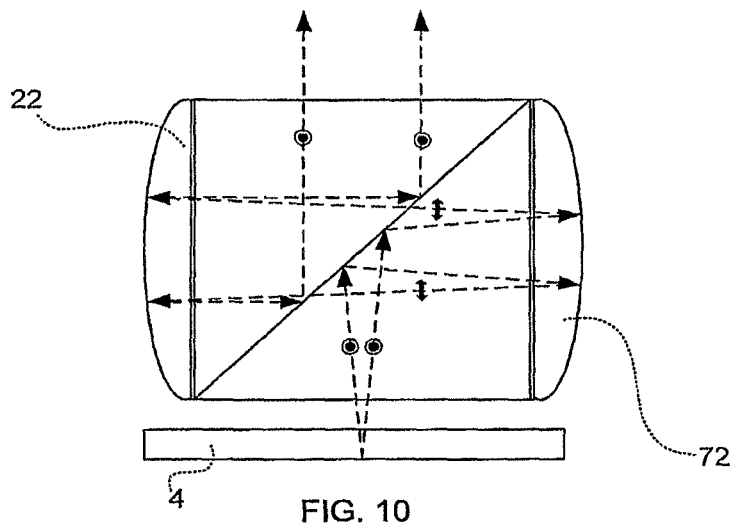

FIG. 10 illustrates an optical device with two converging collimating components 22 and 72, wherein it is not necessary to utilize the blank plate 62 (of FIG. 8). This device is shorter than the one shown in FIG. 8 as well as narrower than the one which shown in FIG. 1.

Another advantage of the proposed imaging device illustrated here manifests itself when utilizing an LCOS light source device as the display light source. Like LCD panels, LCOS light source panels contain a two-dimensional array of cells filled with liquid crystals that twist and align in response to control voltages. With the LCOS light source, however, the cells are grafted directly onto a reflective silicon chip. As the liquid crystals twist, the polarization of the light is either changed or unchanged following reflection of the mirrored surface below. This, together with a polarizing beamsplitter, causes modulation of the light-waves and creates the image. In addition, the reflective technology means the illumination and imaging light beams share the same space. Both of these factors necessitate the addition of a special beamsplitting optical element to the module, in order to enable the simultaneous operations of the illuminating as well as the imaging functions. The addition of such an element would normally complicate the module and, when using an LCOS light source as the display light source, some modules using a frontal coupling-in element or a folding prism would become even larger. For the imaging devices illustrated in FIGS. 8 to 10, however, it is readily possible to add the illuminating unit to the module without significantly increasing the volume of the system incorporating the device.

Figure 11:
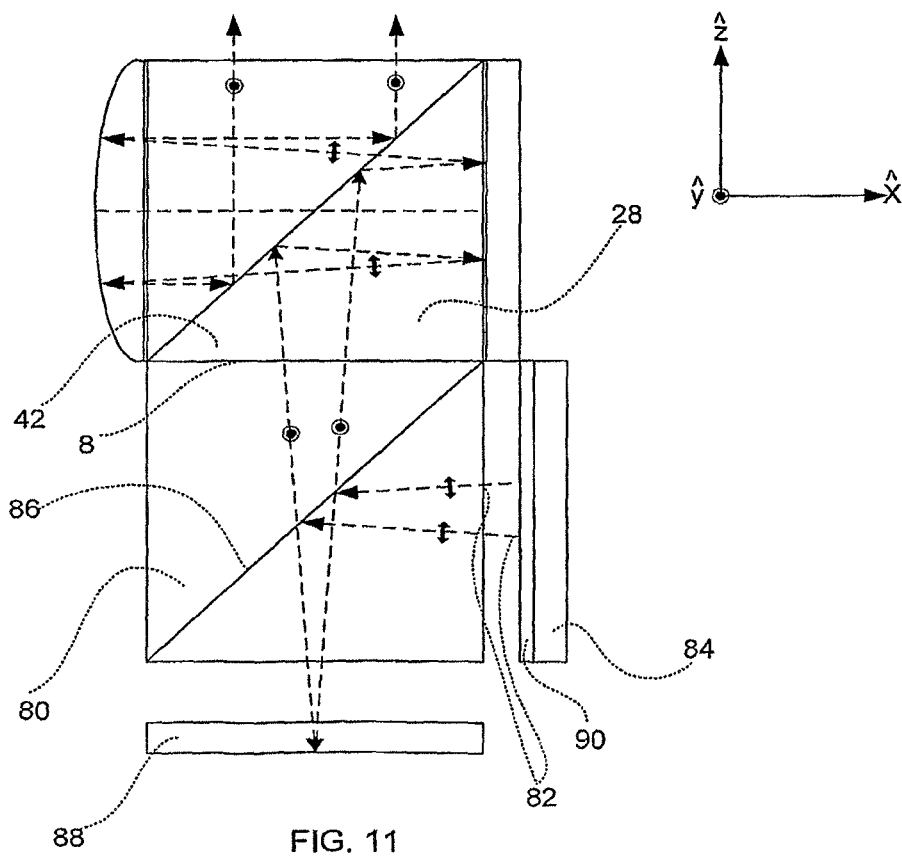

FIG. 11 illustrates a cubic polarizing beamsplitter 80 inserted instead of a simple blank plate between the display light source and the LCCD 28. Here, the p-polarized light-waves 82, emanating from a light source 84, reflect-off the polarizing beamsplitter 86 and illuminate the front surface of the LCOS light source 88. The polarization of the reflected light-waves from the "light" pixels is rotated to the s-polarization and the light-waves are then passed through the beamsplitter 86 and enter the prism 42 through the lower surface 8. The light-waves are then collimated as described above with reference to FIG. 1. If the light-waves source 84 is unpolarized, it is possible to add a polarizer 90, which transmits only the desired polarization. The LCCD 28 remains compact and retains its narrow form.

Figure 12:
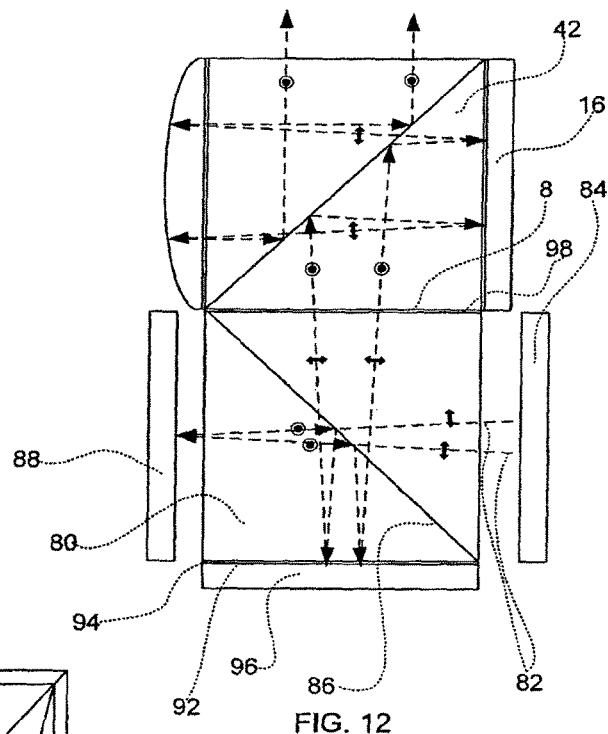

A modified embodiment of FIG. 11, wherein a longer optical pathway inside the LCCD is required, is illustrated in FIG. 12. Here, the p-polarized light-waves 82, emanating from a light source 84, pass through the polarizing beamsplitter 86 and illuminate the front surface of the LCOS light source 88. The polarization of the reflected light-waves from the "light" pixels is rotated to the s-polarization state. Following reflection-off, the polarizing beamsplitter 86, the light-waves are coupled-out of the light-guide 80 through the lower surface 92 of the light-guide. The light-waves then pass through a quarter-wavelength retardation plate 94, reflected by a reflecting optical element 96, return to pass again through the retardation plate 94, and re-enter the light-guide 80 through the lower surface 92. The now p-polarized light-waves pass through the polarizing beamsplitter 86, and enter the upper prism 42 through the lower surface 8. The light-waves are then collimated, as described above with reference to FIG. 1. If it is required that the coupled light-waves 82 into the prism 42 be s-polarized as previously, it is possible to add a half-wavelength retardation plate 98 between prisms 80 and 42, which rotates the light-waves into the desired polarization. The reflecting surfaces 16 and 96 could be replaced by converging optical components, as explained above with reference to FIG. 9.

In the optical devices illustrated in FIGS. 11 and 12, the optical path is folded around the y-axis, i.e., in the x-z plane. Usually, it is preferable to fold the optical path in the plane where the dimensions of the device are minimal. Assuming the configuration of eyeglass systems, the x and y axes refer to the horizontal and vertical axes of the image. For most of the substrate-based eyeglasses configurations, the vertical dimension of the input aperture of the substrate, vis-a-vis the vertical output aperture of the LCCD, is considerably larger than the horizontal dimension of the aperture. Hence, it is preferred to fold the optical pathway in prism 42, which is adjacent to the substrate, around the y-axis, as is illustrated indeed in these Figures. Regarding the display light source, however, the situation is usually the opposite, i.e., the horizontal dimension is larger than the vertical one in a ratio of 4:3 for VGA format and in a ratio of 16:9 for HDTV format. It is therefore preferred to fold the optical pathway in the prism 80, which is adjacent to the display source, around the x axis. A modified embodiment of FIG. 11, wherein the folding of the optical pathway is performed in two different planes, is illustrated in FIG. 13. Here the folding-in prism 80 is performed in the y-z plane, while in prism 42 it is performed in the x-z plane. In this configuration, the light 82 coupled into the prism 80 which is p-polarized compared to the beamsplitter 86 will be s-polarized compared to the folding beamsplitter 10, and no rotating half-wavelength retardation plate is required between prisms 80 and 42.

For eyeglasses configurations it is usually required that the longer dimension of the LCCD be oriented along the handle of the eyeglasses, i.e., normal to the major surfaces of the substrate, as illustrated in the preceding figures. For other configurations, however, such as hand-held displays, it is required that the longer dimension of the LCCD will be oriented parallel to the major surfaces of the substrate.

As illustrated in FIG. 14, the s-polarized light-waves 82, emanating from a light source 84, are reflected-off the first polarizing beamsplitter 86 and illuminate the front surface of the LCOS light source 88. The polarization of the reflected light-waves from the "light" pixels is rotated to the p-polarization state. Following a passage through the polarizing beamsplitter 86, the light-waves are coupled-out of the prism 100 through the lower surface 92 of the prism. The light-waves then pass through a quarter-wavelength retardation plate 94, reflect by a reflecting element 96, return to pass again through the retardation plate 94, and re-enter the prism 100 through the lower surface 92. Following the reflection-off the first polarizing beamsplitter 86 and the second beamsplitter 102, the now s-polarized light-waves are coupled-out of the prism 100 through the lower surface 92 of the prism. The light-waves then pass through a second quarter-wavelength retardation plate 104, collimated by a component 106 at its reflecting surface 108, return to pass again through the retardation plate 104, and re-enter the prism 100 through the lower surface 92. The now-p-polarized light-waves pass through the polarizing beamsplitter 102 and exit the LCCD through the upper surface 110 to enter the substrate 30. If it is required that the coupled light-waves 82 into the substrate 30 be s-polarized as previously, it is possible to add a half-wavelength retardation plate 58 between the upper surface 110 of the LCCD 80 and the lower surface 32 of the substrate 30, which rotates the light-waves into the desired polarization.

A modified embodiment of FIG. 14, wherein the two beamsplitters are oriented parallel to each other, is illustrated in FIG. 15. Here, instead of a right-angle prism 100, a parallelepiped 112 connects the two beamsplitters 86 and 102. As a result, the LCOS light source 88 is not located on the same side of the LCCD as the substrate 30, but on the other side. This modification is required for systems where it is not allowed to locate the PCB of the LCOS light source near the substrate, due to assembly considerations.

In all the eyeglasses configurations illustrated above, the display source plane is oriented parallel to the major surfaces of the substrate. There are systems however, mainly with display sources having PCB with large area, where it is required that the display source plane be oriented normal to the major surfaces of the substrate.

FIG. 16 illustrates a modified LCCD 114 containing two embedded polarizing beamsplitters 116 and 118, two quarter-wavelength retardation plates 120 and 122, two reflecting surfaces 124 and 126 and a converging lens 128. As illustrated, the s-polarized input light-wave 130 from the display source 132 reflects off the first reflecting surface 124. Then, following total internal reflection off the left surface 134 of the LCCD 114, the light-waves are reflected off the first beamsplitter 116 and are coupled out. It is then reflected and changed to p-polarized light by the retardation plate 120 and the second reflecting surface 126. Following a passage through the polarizing beamsplitters 116 and 118, the light-waves are reflected, collimated and changed back to s-polarized light by the retardation plate 122 and the converging lens 128. The light-waves are then reflected off the second polarizing beamsplitter 118 and exit the LCCD through the upper surface 136. The incoming light-waves are now trapped into the substrate 30 in the same manner as illustrated in FIG. 2.

As illustrated in FIG. 17, in the event where the display light source is an LCOS light source device, the illumination will be changed by adding a complementary prism 138 with an embedded polarizing beamsplitter 139 (instead of the reflecting surface 124 of FIG. 16), and a front illumination module 140.

For all the optical configurations which are illustrated herein, the coupling-in of the light-waves into the substrate is performed utilizing a reflecting surface 38 embedded in the substrate. This coupling-in method, however, suffers from a few major drawbacks. Firstly, since the reflecting surface 38 and the partially reflecting surfaces 36 are oriented at different angles, the fabrication process of the substrate having an internally embedded reflecting mirror 38, is rather complicated. In addition, the distance l (FIG. 2) between the input and the output apertures of the substrate, which are set by the coupled-in mirror 38 and the coupled-out surfaces 36 respectively, is determined by the fabrication process of the substrate. It is therefore not possible to control the distance l for a given substrate and for many applications it is required to keep l as a flexible parameter. For example, in eyeglasses configuration, the distance l depends on the size and the shape of the viewer's head and on the particular model of the eyeglasses frame. It is therefore advantageous to have the ability to set l during the assembly process, since otherwise, it is required to manufacture the substrates with a large variety of sizes in order to accommodate all the required possibilities. As a result, a simpler coupling-in configuration is preferred as compared to that which is illustrated hereinabove.

The objective is therefore to find an alternative coupling-in mechanism which will replace the input mirror 38. FIG. 18 illustrates a span of rays that are intended to be coupled into the substrate with a minimal required input aperture. In order to avoid an image with gaps or stripes, the points on the boundary line 146 between the edge of input aperture 148 and the lower surface 150 of the substrate 30, should be illuminated for each one of the input light-waves by two different rays that enter the substrate from two different locations: one ray 152a that illuminates the boundary line 146 directly, and another ray 152b, which is first reflected by the upper surface 154 before illuminating the boundary line. The size of the input aperture is usually determined by two marginal rays: the rightmost ray 156b of the highest angle of the FOV and the leftmost ray 158a of the lowest angle of the FOV.

The simplest way to couple these rays into the substrate is illustrated in FIG. 19. Here, the principal axis 160 of the LCCD 28 is oriented at the required off-axis angle α compared to the major plane of the substrate. A relay prism 162 is located between the LCCD 28 and the substrate 30 and is optically cemented to the lower surface 32 of the substrate such that the light from the display source is trapped inside the substrate by total internal reflection. The overall shape and size of this module conforms to most of the relevant applications. Here, the optical component for coupling light-waves into the substrate is no longer a part of the substrate, but rather a part of the LCCD. Specifically, since the light-waves are reflected from the polarizing beamsplitter 10 directly into the substrate at an oblique angle which couples the light-waves inside the substrate by total internal reflection, it can be related to as the coupling-in element.

In the optical collimating module illustrated in FIG. 19, the off-axis angle of the span of rays that are intended to be coupled into the substrate, are set by rotating the LCCD module. There are, however, cases where it is required to utilize collimated light-waves that impinges the substrate, normal to the substrate plane. In these cases an alternative coupling-in mechanism should replace the input mirror 38.

As illustrated in FIG. 20, the lower surface 168 of a coupling-in prism 170 is optically cemented to the substrate 30 at the upper surface 154 of the substrate. The collimated light-waves from the collimating optical device (not shown) pass through the substrate 30 and the prism 170 and are then reflected from the reflecting surface 172. After passing again through the prism 170 the light-waves are coupled into the substrate by total internal reflection. Similarly to what is illustrated above in FIG. 18, in order to avoid an image with gaps or stripes, the points on the boundary line 176 between the lower surface 168 of the prism 170 and the upper surface 154 of the substrate 30 should be illuminated for each one of the input light-waves by two different rays that enter the substrate from two different locations: one ray 152a first passes through prism 170 and is reflected by the reflecting surface 172, from there it illuminates the boundary line 176. Another ray 152b, is first reflected by the reflecting surface 172 and then by the lower surface 150 of the substrate 30 before illuminating the boundary line. To avoid undesired reflections from the left surface 174 it can be coated by an opaque obstructive layer.

There are a few alternatives as to the precise way in which a substrate can be utilized with the embodiments directed to the eyeglasses configuration. The simplest option is to use a single element for one eye. Another option is to use an element and a display source for each eye, projecting the same image, wherein the preferred place for the LCCD modules is next to the temples. A similar option is to project the same image for both eyes but utilize only one LCCD which is located between the two glasses, whereby its output is split between the two substrates. Alternatively, it is possible to project two different parts of the same image, with some overlap between the two eyes, enabling a wider FOV. Yet another possibility is to project two different scenes, one directed to each eye, in order to create a stereoscopic image. With this alternative, attractive implementations are possible, including three dimensional movies, advanced virtual reality, training systems, and the like.

An embodiment of a double-image arrangement, containing a single display light source 180, two LCCDs 182R and 182L, two coupling-in prisms 184R and 184L and two substrates 30R and 30L is illustrated in FIG. 21. The collimating of the right light-waves by the LCCD 182R and the coupling in by the prism 184R into the substrate 30R is similar to that illustrated above with reference to FIGS. 2 and 20, respectively. The main difference in the LCCD 182R is that instead of utilizing a simple reflecting mirror, a half-reflecting beamsplitter 186 is localized between the LCCDs 182R and 182L. As illustrated, the light-waves which partially pass through the beamsplitter 186 changed to p-polarized light by passing through two quarter wave retardation plates 188R and 188L, which are positioned between the beamsplitter 186 and LCCDs 182R and 182L, respectively. The p-polarized light passes through the polarizing beamsplitter 190L. The light-waves are then reflected, collimated and changed back to s-polarized light by the retardation plate 192L and converging lens 194L. Following a reflection off the polarizing beam-splitter 190L, the light-waves are reflected and changed back top-polarized light by the retardation plate 196 and the reflecting surface 198. The light-waves then pass through the polarizing beamsplitter 190L and exit the substrate through the upper surface 200L. The incoming waves could be trapped into the substrate in the same manner as that illustrated in FIG. 20.

As illustrated, the polarization of images 202L and 202R which are formed by the LCCDs 182L and 182R are p and s, respectively, which might be a shortcoming for systems where a similar polarization is required from both images. A half-wavelength retardation plate 204 is inserted between the left LCCD 182L and the left substrate 30L to form two identical linearly s-polarized images, 206L and 206R, which are projected into the viewer's eyes 208L and 208R, respectively. In order to form a proper binocular image, it is essential that the images 206L and 206R be identical. Therefore, the optical pathways between the display source 180 and the reflecting surfaces of the converging lenses 194L and 194R, as well as the focal lengths of these lenses, should be identical. In addition, the parity of the number of reflections in the two LCCDs 182L and 182R should be equal. As seen in FIG. 21, the number of reflections is four and two in the LCCDs 182L and 182R respectively, and the required identical parity is achieved.

This optical arrangement could be assembled inside a spectacles frame, to form an optical device, wherein the same image is projected for both eyes 208L and 208R by utilizing only one display light source 180 located between the two glasses. Usually, the nose-bridge of a conventional spectacles frame is located a few millimeters above the eyes.

FIG. 22 illustrates how to properly insert the images into the eyes of the user. Here, the center of the display light source 180 is located above the centers of the eyes 208L and 208R. In addition, the coupling-in prisms 184L and 184R are rotated to a geometry wherein the reflecting mirrors of the prisms 184L and 184R are oriented parallel to the partially reflecting surfaces 36L and 36R, respectively. As a result, the projections of the central light-waves 21 OL and 21 OR on the substrate planes are parallel to the major axes of the substrates 212L and 212R, respectively, and the image light-waves are coupled into the substrate where the major axes of the images are inclined a few degrees above the horizon. The partially reflecting surfaces 36L and 36R reflect the coupled images back to their original directions and the central image light-waves are again parallel to the horizon. The optical module, which can be added to any conventional frame, can be very compact and lightweight, with no disturbance to the user.

In the embodiment illustrated in FIGS. 21 and 22 a single display source is utilized. As a result, only a system having identical images for both eyes can be materialized using this embodiment An alternate manner of utilizing two different display sources 214L and 214R, is illustrate in FIG. 23. Here, the light-waves from the display sources 214L and 214R are coupled into an intermediate prism 216 through surfaces 218L and 218R, respectively. The light-waves are then collimated by the LCCDs 220R and 220L and trapped inside the substrates 30R and 30L, respectively in a similar manner to that described above with reference to FIG. 20. A similar structure is illustrated in FIG. 24 wherein the light-waves coupled into the prism 216, are reflected off the mirror 222. Here, the light-waves from the display sources 214L and 214R are coupled into the substrates 30L and 30R, respectively. Unlike the previous embodiment which is illustrated in FIGS. 21 and 22, here the display sources are located at the same level as the viewer's eyes, where the space 224 between the LCCDs 220L and 220R is preserved for the upper part of the nose.

The embodiments illustrated in FIGS. 23 and 24 are capable of projecting stereoscopic images, as well as have a wider FOV, by utilizing two different display sources. The necessity to use two different display sources, however, increases the volume, the power consumption, as well as the fabrication costs of the optical system. An alternative manner, utilizing only a single display source while still preserving the advantages of the embodiments of FIGS. 23 and 24, is described in FIG. 25. Here, only a single display source is located next to surface 218L and a beamsplitter 226 is inserted into the intermediate prism 216. Apparently, the manner in which a conventional display source 216 and beamsplitter 226 are utilized, is not possible, since the parity of the two images is different, namely, the left image is reflected five times, while the right image is reflected four times before being coupled into the substrates. The images will be the mirror images of each other. Therefore, to enable the projection of a proper imagery into the eyes, a dynamic half-wavelength retardation plate 228 is inserted between display source 214 and surface 218L, and a polarizing beamsplitter 226 is inserted into the prism 216. Here, the display source 214, synchronized with the retardation plate. 228, operates at a double rate compared to the usual. At the first stage of each double-cycle, an image which is designated to the left eye emanates from the display source. At the same time, the dynamic retardation plate is switched to the off position and the s-polarized light-waves are reflected off the polarizing beamsplitter 226, collimated by the LCCD 220L, and coupled into the left substrate 30L. At the second stage of each double-cycle an image which is designated to the right eye emanates from the display source. At the same time, the dynamic retardation plate 228 is switched to the on position, the polarization of the light-waves is rotated to the p-state and now the p-polarized light-waves pass through the polarizing beamsplitter 226, collimated by the LCCD 220R and coupled into the right substrate 30R. The images which are projected into the viewer's eyes can now either be identical, stereoscopic, two different parts of the same image with some overlap between the two eyes, or any desired combination.

Hereinbefore it was assumed that the polarizing beamsplitters totally reflect one polarization and totally transmit the other one. The operation of the beamsplitter is not perfect and there is cross-talk between the two states. As a result, a small fraction of the s-polarized light-waves pass through the beamsplitter and a small fraction of the p-polarized light-waves are reflected off the beamsplitter.

As illustrated in FIG. 26, a part 230, the original s-polarized light-waves 2 emanated from the display source 4, passes through the beamsplitter 10 and is coupled-out of the LCCD 28 at a similar direction to that of the collimated light-wave 232, and therefore, they cannot be laterally separated. In addition, since these two light-waves are s-polarized, they cannot be separated utilizing a polarization sensitive element. As a result, the undesired light-waves 230 will be projected into the viewer's eye and a ghost image interfering with the original image, will be created.

A possible way to overcome this problem is illustrated in FIG. 27. Here, instead of utilizing a single polarizing beamsplitter 10, two different polarizing beamsplitters, 234 and 236, and a linear polarizer 238 which is oriented to block s-polarized light, are disposed into the LCCD 28. Now, the s-polarized light-waves 240 which pass through the first polarizing beamsplitter 234 are blocked by the polarizer 238. On the other hand, the light-waves which are reflected as intended by the first polarizing beamsplitter, are changed to p-polarized light by the retardation plate 14 and the reflecting surface 16. Following a passage through the first beamsplitter 234, the polarizer 236 and the second polarizing beamsplitter 238, the light-waves are then reflected, collimated and changed back to s-polarized light by the retardation plate 20 and the optical element 22. Following a reflection off the second polarizing beamsplitter 236, the light-waves exit the substrate properly collimated through the upper surface 26. While the configuration illustrated in FIG. 27 solves the ghost image problem, the necessity to embed two different polarizing beamsplitters and a linear polarizer inside the LCCD complicates the fabrication process of the optical module.

Heretofore, it has been assumed that the polarizing beamsplitter is oriented at an angle of 45° in relation to the major surfaces of the LCCD, and that the main output direction from the LCCD (namely, the direction of the principal ray of the central light-wave) is identical (as in FIG. 1) or normal to (as in FIG. 17) the main input direction on the LCCD. An alternative manner for separating between the real and the ghost images by utilizing a different angle is illustrated in FIG. 28. Accordingly, the angle between the lower surface 8 of the LCCD and the beamsplitter 10 is set to be 45°+α, wherein a positive angular rotation is defined to be counterclockwise. As a result, the principal ray 242 from the light-wave 2 is rotated by the beamsplitter 10 to the angle 90°+2α and is reflected to the angle 270°−2α by the reflecting surface 16. In order to minimize field aberrations, the main axis of the collimating optical element 22 is oriented collinear with the incoming principal ray 244. Hence, the ray is reflected back by the lens to the angle 90°−2α. The second reflection off the beamsplitter 10 yields the final direction of the principal ray to be 4α. Hence, the output direction of the principal ray 244 is substantially different than the input direction of the ray. Therefore, the real and the ghost images can now be angularly separated.

A slightly modified embodiment is illustrated in FIG. 29 where, in addition to the rotation of the beamsplitter 10, the reflecting surface 16 is rotated at an angle of β compared to its original orientation. As a result, the direction of the output central ray from the LCCD is now 4α+2β. Another example, which is related to the embodiment of FIG. 15, is illustrated in FIG. 30. Here, the angle between the incoming surface 246 and the first polarizing beamsplitter is 45°+α and the angle between the reflecting surface 250 and the output surface 252 is a. Therefore, the output direction from the LCCD of the principal ray 253 is substantially. different than the normal to the input direction of that ray 253 from the LCCD. As a result, the angle between the ghost and the real images is 2α.

In certain situations positioning the beamsplitter at an orientation of 45°+α in relation to the major surfaces of the LCCD does not provide sufficient results, regarding the ghost image. A possible way of overcoming this problem is by combining both methods according to FIG. 31. Here, instead of utilizing a single polarizing beamsplitter 248 of FIG. 30, two different polarizing beamsplitters, 254 and 256, are inserted at an orientation of 45°+α in relation to the major surface of the LCCD 258. In this case, even a ghost image which is at an angle of 2α with respect to the real image is obstructed by the second polarizing beamsplitter.

There are various types of polarizing beamsplitters. One type contains a layer of film. This type cannot be utilized in an imaging system because the surface quality of the film is usually not sufficient for imaging of s-polarized light that is reflected off of it. On the other hand, p-polarized light that passes through the film preserves the quality of the image, and therefore, this beamsplitter can be used for illuminating the light display source. In this case, the beamsplitter cannot have a dual function of illumination as well as the imaging functions, such as beamsplitter 248 shown in FIG. 30.

In FIG. 32, the s-polarized light-waves 258, emanating from a light source 260, are reflected off the first polarizing beamsplitter 262 and illuminate the front surface of the LCOS light source 264. The polarization of the reflected light from the "light" pixels is rotated to the p-polarization state. The p-polarized light then passes through the polarizing beamsplitter 262 and the light-waves pass through a half wave retarder 266 and are rotated to s-polarized light. The light is then reflected off of the second beamsplitter 268 and is coupled out of the prism 270 through the lower surface 272 of the prism. The light-waves then pass through a quarter-wavelength retardation plate 274, reflected by a reflecting optical element 276, return to pass again through the retardation plate 274, and re-enter the prism 270 through the lower surface 272. The now p-polarized light passes through the second polarizing beamsplitter 268 and is coupled out of prism 278 through the upper surface 280 of the prism. The light-waves then pass through a second quarter-wavelength retardation plate 282, collimated by a lens 283 at its reflecting surface 284, return to pass again through the retardation plate 282, and re-enter prism 278 through surface 280. The now s-polarized light-waves are reflected off the polarizing beamsplitter 268 and exit the substrate through the upper surface 285 to enter the substrate 286 such that the light from the display source is trapped inside the substrate by total internal reflection.

An additional configuration meeting the requirement of the beamsplitter having a single function of illuminating the display source is described in FIG. 33. The s-polarized light-waves 288, emanating from a light source 290, are reflected off the first polarizing beamsplitter 292 and illuminate the front surface of the LCOS light source 294. The polarization of the reflected light from the "light" pixels is rotated to the p-polarization state. The p-polarized light then passes through the polarizing beamsplitter 292 and the light-waves pass through a half wave retarder 295 and are rotated to s-polarized light. The light is then reflected off the first reflecting surface 296 and follows total internal reflection off the lower surface 298 of the prism 300. The light-waves are then reflected off the polarizing beamsplitter 302 and are coupled out through the lower surface 298 of the prism. They pass through a quarter-wavelength retardation plate 304, are collimated by a lens 306 at its reflecting surface 308, return to pass again through the retardation plate 304, and re-enter prism 300 through the lower surface 298. The now p-polarized light-waves pass through the polarizing beamsplitter 302 and exit the substrate through the upper surface 310.

In FIGS. 32 and 33, the s-polarized light that is reflected off the beamsplitter is reflected before the light impinges the display source, and hence, the first beamsplitter is not limited to a certain type, as opposed to the second beamsplitter, which is limited to a type which preserves the quality of the image.

An additional advantage illustrated in FIGS. 28 to 31 is that it is possible to differentiate between the mechanical orientation of the LCCD and the direction of the output wave. There are cases where it is required to rotate the mechanical axis of the LCCD while still retaining the on-axis impinging angle on the substrate.

As illustrated in FIG. 34, the angle between the lower surface 8 and the beamsplitter 10 is set to −45°−α. As a result, the angle between the input and the output lightwaves of the LCCD is −4α. Therefore, the mechanical angle between the major axis of the LCCD and the normal to the substrate, is −4α while the central output wave from the LCCD vis-a-vis the central input light-wave of the substrate impinges normal to the major surface of the substrate, as required.

FIG. 35 illustrates another example based on the embodiment which is described above with reference to FIG. 19. Here, the angle between surface 8 and the beamsplitter 10 is 52.5°. Therefore, while the mechanical axis of the LCCD is oriented at an angle of 30° to normal of the major surfaces of the substrate, the central incoming wave is oriented at the required off-axis angle of 60°.

There are applications wherein high-brightness image is required and hence an LCOS light source is the preferred image source instead of the back-illuminated LCD which is illustrated in FIGS. 34 and 35.

As shown in FIG. 36, a cubic polarizing beamsplitter 316 is inserted between the display source and the LCCD. Here, the s-polarized light-waves 314, emanating from a light source 84, reflect off the polarizing beamsplitter 312 of a prism 316 and illuminate the front surface of the LCOS light source 318. The polarization of the reflected light from the "light" pixels is rotated to the p-polarization and the light-waves are then passed through the beamsplitter 312 and enter the prism 320 through the lower surface 8. The light-waves are then collimated as described above with reference to FIG. 35. As before, if it is required that the coupled light 314 into the prism 320 will be s-polarized as in the folding beamsplitter 316, and it is possible to add a half-wavelength retardation plate 322 between prisms 316 and 320, which rotates the light into the desired polarization.

In the optical systems illustrated in FIG. 36, the optical path is folded around the y axis, that is, in the x-z plane, wherein the x and y axes are referred to the horizontal and vertical axes of the image. Usually, it is preferred to fold the optical system in the plane wherein the dimensions of the system are minimal. As explained above with reference to FIG. 13, for most configurations, the horizontal dimension is larger than the vertical one in a ratio of 4:3 for VGA format and in a ratio of 16:9 for HDTV format. Therefore, it is preferred to fold the optical pathway in the prism 316, which is adjacent to the display source, around the x axis.

A modified version of FIG. 36, wherein the optical pathway is folded in two different planes is illustrated in FIGS. 37 (top view), 38 (side view) and 39 (three dimensional view). Here the folding-in prism 316 folds the light in the y-z plane by the polarizing beamsplitter, while in prism 320 it is folded in the x-z plane. In this configuration, the light 314 coupled into the prism 320, which is p-polarized compared to the beamsplitter 312, will be s-polarized compared to the folding beamsplitter 320, and no rotating half-wavelength retardation plate is required between prisms 316 and 320.

So far, in all the embodiments which were illustrated in FIGS. 2 to 39 it has been assumed that the LCCD and the substrate are fabricated from the same optical material. There are cases where it is required to utilize different optical materials having different optical properties for at least parts of the LCCD and the substrate. For example, it is sometimes necessary to fabricate the LCCD from a specific polymer-based material, having a refractive index $n_1$ and an Abbe value $v_1$ because of high-volume fabrication method restrictions, while it is required to fabricate the substrate from a silicate based material, having a different refractive index $n_2$ and an Abbe value $v_2$, because of some optical and system consideration. For some systems, the differences in the optical properties of the two elements should not cause any particular problem. As illustrated in FIGS. 6 to 14 the central light-wave intersects the interface plane between the LCCD and the substrate normal to the plane. As a result, the direction of the incoming light-wave will not be influenced by the optical difference between the two elements. Even for the other light-waves in the image, the intersection angle of the interface plane will be fairly small and the undesired effects will be negligible.

For the optical systems illustrated in FIGS. 19 and 34 to 39, however, the central wave intersects the interface plane between the LCCD and the substrate at a highly oblique angle which is larger than the critical angle for total internal reflection inside the substrate. As a result, undesired effects may appear which may severely degrade the optical performance of these systems.

FIG. 40 illustrates an embodiment of an optical system comprising an optical device 28 having an input surface 8 and an exit surface 26 for collimating light waves emitted from a light source 4 and coupled into a substrate 30 through an optical element 325. The light waves enter the substrate 30 via an input aperture 321 and exit the substrate via an output aperture 323.

As further illustrated in FIG. 40, a ray 324 from the central wave of the image source impinges on the interface plane 326 between the LCCD and the substrate at an off-axis angle $\alpha_{in}$. It is assumed that the LCCD and the substrate have been fabricated of different optical materials having refractive indices and Abbe values of $n_1$, $v_1$ and $n_{2,v2}$, respectively. It is also assumed that the ray 324 is a continuum of wavelengths over the entire photopic spectrum, but for the simplicity of the illustration only three representative wavelengths: $\lambda_r$; $\lambda_g$ and $\lambda_b$ have been considered. The off-axis angle $\alpha'_{in}$ of coupled ray inside the substrate is given by:

$$\sin\alpha'_{in} = \sin\alpha_{in} \cdot \frac{n_1}{n_2} \quad (1)$$

Because of the different properties of the optical materials of the LCCD and the substrate, the term $n_2/n_1$ is usually not uniform for the entire photopic spectrum, that is:

$$\frac{n_1(\lambda_1)}{n_2(\lambda_1)} \neq \frac{n_1(\lambda_g)}{n_2(\lambda_g)} \neq \frac{n_1(\lambda_b)}{n_2(\lambda_b)} \quad (2)$$

Consequentially:

$$\sin\alpha'_{in}(\lambda_2) \neq \sin\alpha'_{in}(\lambda_g) \neq \sin\alpha'_{in}(\lambda_b) \quad (3)$$

That is, the single incoming ray 324 is divided into three different rays 328, 330 and 332 inside the substrate 30 for the three different wavelengths $\lambda_r$, $\lambda_g$ and $\lambda_b$, respectively. As a result, the output light-waves 333 which are coupled out of the substrate 30 are smeared as a function of the wavelength, and the image quality will suffer from a severe chromatic aberration.

Another undesired effect is illustrated in FIG. 41. The central point of the image source and the two marginal points, which are at the same distance from the central point, are represented by the three rays, 334, 336 and 338, respectively. After the rays. are collimated by the LCCD, the two marginal rays are equally angularly deviated from the central ray, i.e., the incoming angles of the three rays 334, 336 and 338 on the interface plane 326 are $\alpha'_{out}$, $\alpha'_{out}-\delta$ and $\alpha'_{out}+\delta$, respectively. The angular deviation between the incoming ray and the coupled ray inside the substrate is given by:

$$\Delta\alpha_{in} = \alpha'_{in} - \alpha_{in} \approx \frac{\sin\alpha'_{in} - \sin\alpha_{in}}{\cos\alpha_{in}} \quad (4)$$

Inserting Eq. (1) into Eq. (4) yields:

$$\Delta\alpha_{in} \approx \frac{\frac{n_1}{n_2}\sin\alpha'_{in} - \sin\alpha_{in}}{\cos\alpha_{in}} = \left(\frac{n_1}{n_2} - 1\right)\tan\alpha_{in} \quad (5)$$

Similarly, for the two marginal rays, the angular deviations between the incoming rays and the coupled rays inside the substrate are given by:

$$\Delta(\alpha_{in} - \delta) \approx \left(\frac{n_1}{n_2} - 1\right)\tan(\alpha_{in} - \delta) \quad (6)$$

$$\Delta(\alpha_{in} + \delta) \approx \left(\frac{n_1}{n_2} - 1\right)\tan(a_{in} + \delta)$$

That is, the incoming rays refract differently into the substrate 30 and as a result the angular deviations between the marginal rays 336 and 338 and the central ray 334 inside the substrate, are no longer equal. Consequently, the coupled-out image 339 will appear distorted to the viewer's eye.

A possible method of overcoming these problems, at least partially, is illustrated in FIG. 42. Here, the intermediate optical element 325, e.g., a prism 340 between the LCCD and the substrate is fabricated of an optical material having a refractive index and an Abbe value of $n_3$ and $v_3$, respectively. The optical element 325, which is practically a part of the LCCD 28, can be fabricated of an optical material, which is similar to that of the substrate 30. The interface plane 342 between the optical element 325 and the LCCD is slanted at an angle $\beta_{int}$ in respect to the interface plane 326 between the substrate and the prism. Now, the incoming rays intersect two interface planes before being coupled into the substrate. By proper control of the parameters $n_3$, $v_3$ and $\beta_{int}$ it is now possible to overcome the problems mentioned above. Naturally, not all the required parameters can be physically or technically achieved, for example, by fabricating the intermediate prism from the same optical material as the substrate and by choosing $\beta_{int}=\alpha_{in}$. Since the central wave intersects the interface plane 342 normal to the plane and since the other interface plane is located between two identical materials, it is possible to eliminate the chromatic aberration as well as the dispersion. Unfortunately, The angle $\alpha_{in}$ is a relatively large angle and setting $\beta_{int}=\alpha_{in}$ will significantly increase the volume of the LCCD, reduce the achievable field-of-view and considerably degrade the overall optical performance of the system. In addition, only limited discrete values of $n_3$ and $v_3$ are physically achievable.

Nevertheless, for most cases, by proper optical design, as illustrated in FIGS. 42 and 43, achievable values of the parameters $n_3$, $v_3$ and $\beta_{int}$ can be found that will significantly reduce the chromatic aberrations as well as the distortion of the optical system. As illustrated in FIG. 42, the chromatic aberrations which are created by the interface planes 326 and 342 are mutually compensated, wherein in FIG. 43 the total distortion which is created by these interface planes is significantly smaller than the distortion which is illustrated in FIG. 41, wherein the distortion is created by a single interface plane 326.

FIG. 44 is a three-dimensional illustration of a system where the display source is an LCOS light source which is illuminated by the same method as described above with reference to FIGS. 37 to 39. Since the interface between the LCCD and the substrate in FIG. 44 is identical to that of an LCD-based system, the design procedure should be also similar here.

Another situation where a combination of an LCCD and a substrate can yield an optical system which suffers chromatic aberration, as well as distortion, is illustrated in FIG. 45. The input light-waves are coupled into the LCCD normal to the input surface 344, the central light-wave is reflected off of the partially reflective surfaces 36 of the substrate at an output direction which is significantly deviated at an angle $\alpha'_{out}$ in respect to the normal of the substrate's plane. Assuming that the refractive index and the Abbe value of the substrate are $n_2$ and $v_2$ and that the light-waves are coupled out from the substrate into the air, the coupling-out angle of the output waves from the substrate are:

$$\sin \alpha_{out} = \sin \alpha'_{out} \cdot n_2 \quad (8)$$

An example for an optical system where the output light-waves are significantly oblique to the substrate plane is in a case where it is required that the projected image will not block the central angular area of the viewer. In that case, it is preferred to project the image from the peripheral part of the substrate. Since the optical material of the substrate has a finite Abbe value $v_2$ the output direction depends on the wavelength of the optical ray, that is:

$$\sin \alpha_{out}(\lambda) = \sin \alpha'_{out} \cdot n_2(\lambda) \quad (9)$$

The term $n_2$ is usually not uniform for the entire photopic spectrum, that is:

$$n_2(\lambda_r) \neq n_2(\lambda_g) \neq n_2(\lambda_b) \quad (10)$$

and consequentially:

$$\sin \alpha_{out}(\lambda_r) \neq \sin \alpha_{out}(\lambda_g) \neq \sin \alpha_{out}(\lambda_b) \quad (11)$$

That is, the single incoming ray 346 is divided outside the substrate into three different rays 348, 350 and 352 outside the substrate for the three different wavelengths $\lambda_r$, $\lambda_g$ and $\lambda_b$, respectively. As a result, the output light-waves which are coupled out of the substrate are smeared as a function of the wavelength, and the image quality will suffer from a severe chromatic aberration.

As illustrated in FIG. 46, another related problem is the distortion. The central point of the image source and the two marginal points which are at an equal distance from the central point are represented by the three rays, 354, 356 and 358, respectively. After the rays are collimated by the LCCD, the two marginal rays are equally angularly deviated from the central ray. That is, the off-axis angles of the three rays 354, 356 and 358 after the reflection from the partially reflection surfaces 36 are $\alpha'_{out}$, $\alpha'_{out}-\delta$ and $\alpha'_{out}+\delta$, respectively. Similarly to the derivation of Eq. (7), it can be shown that the angular deviations between the reflected rays from the partially reflective surfaces and the coupled rays outside of the substrate are given by:

$$\Delta(\alpha'_{out}) \approx (n_2-1)\tan(\alpha'_{out})$$

$$\Delta(\alpha'_{out}-\delta) \approx (n_2-1)\tan(\alpha'_{out}-\delta)$$

$$\Delta(\alpha'_{out}+\delta) \approx (n_2-1)\tan(\alpha'_{out}+\delta) \quad (12)$$

Therefore the off-axis angles of the coupled-out central and the two marginal rays from the substrate are:

$$\sin(\alpha'_{out}) + \Delta(\alpha'_{out}) \approx \sin(\alpha'_{out}) + (n_2-1)\tan(\alpha'_{out})$$

$$\sin(\alpha'_{out}-\delta) + \Delta(n_{out}^1-\delta) \approx \sin(\alpha'_{out}) + (n_2-1)\tan(\alpha'_{out}-\delta)$$

$$\sin(\alpha'_{out}+\delta) + \Delta(\alpha_{out}^1+\delta) \approx \sin(\alpha'_{out}) + (n_2-1)\tan(\alpha'_{out}+\delta) \quad (13)$$

That is, the coupled-out rays refract differently from the substrate and as a result the angular deviations between the marginal rays 356 and 358 and the central ray 354 outside the substrate are no longer equal. Consequently, the coupled-out image will appear distorted to the viewer's eye. The chromatic aberrations and the distortion are caused by the interface between the substrate and the air, namely, the lower surface 32 of the substrate. These problems, however, are valid for all the possible configurations of a peripheral image, even when both the substrate and the LCCD are fabricated from the same optical material. In addition, these problems are also valid not only for systems where the trapped light-waves intersect the input aperture of the substrate at an oblique angle, as illustrated in FIGS. 40 to 47, but also for systems, e.g., as illustrated in FIGS. 6 to 14, wherein the trapped light-waves intersect the input aperture of the substrate at an angle smaller than the critical angle, for total internal reflection inside the substrate and even for systems where the light-waves intersect the input aperture of the substrate substantially normal to the major plane.

To solve these problems, the same configuration illustrated with reference to FIGS. 42 and 43, is used, namely, an intermediate prism 340 which is fabricated of an optical material having a refractive index and Abbe value of $n_3$ and $v_3$, respectively, is inserted between the LCCD and the substrate, wherein the interface plane 342 between the prism 340 and the LCCD is slanted at an angle $\beta_{int}$ with respect to the interface plane 326 which is located between the substrate and the prism. It is assumed that in the most general case where the LCCD and the substrate are fabricated of the optical materials, where the refractive indices and Abbe values are $n_1$; $v_1$ and $n_2$; $v_2$, respectively.

As illustrated in FIG. 47, there are now three different interface planes which refract the input light-waves inside the optical system differently: the interface plane 342 between the LCCD and the intermediate prism. the interface plane 326 between the intermediate prism and the substrate and the lower surface 32 of the substrate, which can be regarded as the interface between the substrate and air. Eventually, by proper control of the parameters $n_3$, $v_3$ and $\beta_{int}$, it is possible to decrease these two undesired effects. The figure shows the combination of the chromatic effects of all three interface planes. The central white ray 346 is refracted by the first interface plane 342 into three different rays 348, 350 and 352 which have three different wavelengths $\lambda_r$, $\lambda_g$ and $\lambda_b$, respectively. Each ray is, however, refracted differently by the two other interface planes, 326 and 32, in such a way that all these three rays are coupled-out of the substrate at the same off-axis angle. Hence, the chromatic aberration of the image ray 346 is essentially eliminated.

FIG. 48 illustrates the combination of the distortion effects of all three interface planes. The central point of the image source and the two marginal points which are represented by the three rays 354, 356 and 358, respectively, are equally angularly deviated after the collimation by the LCCD. Each of these rays is differently deviated by the three interface planes, but the combination of all the three different deviations yields a total deviation which is fairly uniform for the different image light-waves. Hence, the total distortion of the optical system is significantly improved as compared to that of FIG. 46, wherein only one interface plane contributes to the distortion.

For some optical systems relatively narrow FOVs are required for a large display source in order to achieve high resolution. This requires a large focal length which can result in a large optical system. One approach is to utilize two lenses in the LCCD which achieves a shorter optical path between the display source and the output surface of the LCCD for the same focal length.

As illustrated in FIG. 49, the s-polarized light-waves 360, emanating from a light display source 362, are reflected off the first polarizing beamsplitter 364 and are coupled-out of the prism 366 through surface 368 of the prism. The light-waves then pass through a quarter-wavelength retardation plate 370, reflected by a first reflecting optical element 372, return to pass again through the retardation plate 370, and reenter the prism 366 through surface 368. The now p-polarized light-waves pass through the polarizing beamsplitter 364 and are coupled out of prism 366 through surface 374 of the prism. The light-waves then pass through a second quarter-wavelength retardation plate 376, diverged by a concave lens 378 at its reflecting surface 380, return to pass again through the retardation plate 376, and re-enter prism 366 through surface 374. The now s-polarized light-waves are reflected off the polarizing beamsplitter 364 and exit prism 366 through the upper surface 382 to enter the second prism 384 through its lower surface 386. The light-waves are then reflected off the second polarizing beamsplitter 388 and are coupled out of the prism 384 through surface 390. The light-waves then pass through a third quarter-wavelength retardation plate 392, reflected by a second reflecting optical element 394, return to pass again through the retardation plate 398, and re-enter prism 384 through surface 390. The now p-polarized light-waves pass through the second polarizing beamsplitter 388 and are coupled-out of prism 384 through surface 396. The light-waves then pass through a fourth quarter-wavelength retardation plate 398, collimated by a convex lens 400 at its reflecting surface 402, return to pass again through the retardation plate 398, and re-enter prism 384 through surface 396. The now s-polarized light-waves are reflected off the second polarizing beamsplitter 388 and exit the substrate through the upper surface 404 to enter the substrate 30.

In all the optical systems which were described above in relation to FIGS. 1 to 49, the LCCD operates as a collimator, namely, a real image from a display light source is focused to infinity. In addition, the main purpose for materializing the LCCD is to create collimated light-waves as the input for a substrate-based optical system. Clearly, an LCCD could be utilized for different optical operations and many other applications, i.e., the LCCD can focus an image to a different distance than infinity and can be inserted into other systems where it is desired to achieve a satisfactory performance and retain a compact and light-weight system.

FIG. 50 illustrates an optical system where the LCCD serves as a focusing lens for a camera. Here the p-polarized component of the input wave 406 from an external scene passes through the upper surface 407 of the LCCD 408 and through the polarizing beamsplitter 410. It is then reflected, converged and changed to s-polarized light by the retardation plate 412 and a focusing lens 414 having a reflective back surface 416. Following a reflection off the polarizing beamsplitter 410, it is reflected and changed to p-polarized light by the retardation plate 417 and a reflecting surface 418. Following a passage through the beamsplitter 410 the converging light-waves exit the LCCD through the left surface 420 and are then focused onto a detector plane 422. A focus mechanism might be added to this device by enabling a lateral translation of the camera or of the focusing lens along the z-axis in relation to the lower plane 424.

Another potential embodiment is illustrated in FIG. 51. Here, a converging LCCD 426 and a collimating LCCD 428 are combined together to form a unity magnification telescope. An optical filter 430 can be inserted into the Fourier plane, in order to perform any required image processing. In addition, an energy-sensitive filter can be inserted to block high-intensity signals. The main drawback of the system illustrated in FIG. 51 is that the image is vertically inverted, i.e., the transferred image appears upside-down to the viewer's eye.

FIG. 52 illustrates a modified system wherein an inverting prism 432 is added at the input surface 434 of the unity magnification telescope. As a result, the image will appear at the proper orientation to the viewer's eye. Different LCCDs can be combined to form magnifying or de-magnifying systems. In addition, the telescope can be combined with a substrate, in order to project a processed or a magnified image from the external view to a viewer's eye.

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

The invention claimed is:

1. An optical system, comprising:
   an optical device (28) for collimating light waves including an arrangement of optical elements having a light-waves input surface (8) and a light-waves exit surface (26);
   a light-waves transmitting substrate (30) having at least two external major surfaces (32, 34) parallel to each other, edges, an input aperture (321) and an output aperture (323);
   an optical element (325) interposed between the exit surface (26) of the collimating optical device (28) and the input aperture (321) of the substrate (30), for coupling the collimated light waves from the optical device (28) into the substrate (30) so that the light waves are trapped inside the substrate by internal reflection;
   at least one partially reflecting surface (36) located in the substrate (30) for coupling the light waves out of the substrate, the partially reflecting surface (36) being non-parallel to the major surfaces (32, 34) of the substrate (30);

the input aperture (321) of the substrate (30) and the optical device optical element (325) defining a first interface plane (326), and the collimating optical device (28) adjacent to the first interface plane (326) is made of a first optical material, and the substrate (30) adjacent to the first interface plane (326) is made of a second, different optical material, wherein each of the light waves coupled by the optical element (325) into the substrate (30) is incident on the first interface plane (326) at a first off-axis angle α and is refracted into the substrate at an off-axis angle α' different from the first off-axis angle.

2. The optical system according to claim 1, wherein the input aperture of the substrate is optically cemented to the exit surface of the collimating optical device at the first interface plane.

3. The optical system according to claim 1, wherein the different optical materials have different optical properties.

4. The optical system according to claim 1, wherein the different optical materials have different refractive indices.

5. The optical system according to claim 1, wherein the different optical materials have different Abbe values.

6. The optical system according to claim 1, further comprising a display light source (4) emitting light waves in a photopic spectrum collimated by the optical device (28) and coupled by the optical element (325) into the substrate so that the collimated light waves are trapped inside the substrate (30) by said internal reflection.

7. The optical system according to claim 6, wherein the light waves trapped in the optical device intersect the first interface plane (326) at an oblique angle.

8. The optical system according to claim 7, wherein the oblique angle is greater than a critical angle, for effecting total internal reflection inside the substrate.

9. The optical system according to claim 7, wherein the collimated light waves comprise at least two different wavelengths.

10. The optical system according to claim 9, wherein each of the light waves of the at least two different wavelengths is refracted into two substantial different directions while passing through the first interface plane.

11. The optical system according to claim 9, wherein the collimating optical device (28) and the optical element (325) are attached to each other at a second interface plane (342).

12. The optical system according to claim 11, wherein a first external surface of a prism is located adjacent to the input surface aperture of the substrate and the second interface plane (342) is slanted at an angle β into with respect to the first interface plane (326).

13. The optical system according to claim 11, wherein collimated light waves passing through the first and second interface planes (326, 342) suffer chromatic aberrations.

14. The optical system according to claim 9, wherein for the two different wavelengths each of the light waves is refracted into two substantial different directions while passing through a second interface plane (342).

15. The optical system according to claim 6, wherein at least a first (334), a second (336) and a third (338) light rays are emanating from the display source 4, the first (334), second (336) and third (338) light rays collimated by the collimating device (28) into three different collimated light rays that propagate into three different directions with an angular deviation between each two of the collimated rays.

16. The optical system according to claim 15, wherein the angular deviation between the first (334) and the second (336) light rays is substantially different than the angular deviation between the first (334) and the third (338) light rays while impinging on the first interface plane (326).

17. The optical system according to claim 16, wherein the angular deviation between the first (334) and the second (336) light rays is equal to the angular deviation between the first (334) and the third (338) light rays after passing through the first interface plane (326).

18. The optical system according to claim 17, wherein first (334), second (336) and third (338) light rays passing through the first interface surface (326) suffer distortion, wherein the light rays passing through the second interface (342) surface suffer distortion, and wherein the distortion at a second interface plane (342) is compensated by the distortion at the first interface plane (326).

19. The optical system according to claim 16, wherein the angular deviation between the first (334) and the second (336) light rays is equal to the angular deviation between the first (334) and the third (338) light rays while impinging on the output aperture (323).

20. The optical system according to claim 19, wherein the angular deviation between the first (334) and the second (336) light rays is substantially different than the angular deviation between the first (334) and the third (338) light rays after passing through the output aperture (323).

21. The optical system according to claim 19, wherein the light rays passing through the first interface plane (326) suffer distortion, the light rays passing through the output aperture (323) suffer distortion and the distortion at the first interface plane (326) is compensated by the distortion at the output aperture (323).

22. The optical system according to claim 21, wherein the light rays passing through a second interface plane (342) suffer distortion and the distortion at the first interface plane (326), the distortion at the second interface plane (342) and the distortion at the output aperture are (323) mutually compensated.

23. The optical system according to claim 15, wherein the angular deviation between the first (334) and the second (336) light rays is equal to the angular deviation between the first (334) and the third (338) light rays while impinging on a second interface plane (342).

24. The optical system according to claim 23, wherein the angular deviation between the first (334) and the second (336) light rays is substantially different than the angular deviation between the first (334) and the third (338) light rays after passing through the second interface plane (342).

25. The optical system according to claim 15, wherein the angular deviation between the interface plane first and second interface plane (326, 342) and optical properties of the optical element (325) and the collimating optical device (28) are selected to minimize distortion of the optical system.

26. The optical device according to claim 15, wherein the first, second and third light rays (334, 336, 338) are coupled into the collimating optical device (28) substantially normal to the input surface (8) of the device, and a central light ray (334) is coupled out from the light-transmitting substrate (30) at an output direction which deviates with respect to normal of major surfaces (32, 34) of the substrate.

27. The optical system according to claim 26, wherein for the two different wavelengths each of the light rays are refracted into two substantial different directions while passing through the output aperture (323).

28. The optical system according to claim 26, wherein the light rays passing through the first interface plane (326) suffer chromatic aberrations, the light rays passing through output aperture (323) suffer chromatic aberrations and the chromatic aberrations at the first interface plane (326) are compensated by the chromatic aberrations at the output aperture (323).

29. The optical system according to claim 28, wherein the light rays passing through a second interface plane (342) suffer chromatic aberrations, and the chromatic aberrations at the first interface plane (326), the chromatic aberrations at the second interface plane (342) and the chromatic aberrations at the output aperture (323) are mutually compensated.

30. The optical system according to claim 1, wherein the optical element (325) is made of the second optical material.

* * * * *